(12) United States Patent
Kopko et al.

(10) Patent No.: US 11,359,847 B2
(45) Date of Patent: Jun. 14, 2022

(54) SYSTEMS AND METHODS FOR CONTROLLING A REFRIGERATION SYSTEM

(71) Applicant: Johnson Controls Technology Company, Auburn Hills, MI (US)

(72) Inventors: William L. Kopko, Jacobus, PA (US); Stephen M. Zardus, York, PA (US); Israel Federman, York, PA (US); Curtis C. Crane, York, PA (US); Todd Kwao-vovo, York, PA (US)

(73) Assignee: Johnson Controls Tyco IP Holdings LLP, Milwaukee, WI (US)

( * ) Notice: Subject to any disclaimer, the term of this patent is extended or adjusted under 35 U.S.C. 154(b) by 296 days.

(21) Appl. No.: 16/326,895

(22) PCT Filed: Aug. 22, 2017

(86) PCT No.: PCT/US2017/048048
§ 371 (c)(1),
(2) Date: Feb. 20, 2019

(87) PCT Pub. No.: WO2018/039254
PCT Pub. Date: Mar. 1, 2018

(65) Prior Publication Data
US 2019/0186801 A1 Jun. 20, 2019

Related U.S. Application Data

(60) Provisional application No. 62/378,148, filed on Aug. 22, 2016.

(51) Int. Cl.
| F25B 49/02 | (2006.01) |
| F25B 25/00 | (2006.01) |
| F25B 23/00 | (2006.01) |

(52) U.S. Cl.
CPC .......... *F25B 49/027* (2013.01); *F25B 23/006* (2013.01); *F25B 25/005* (2013.01);
(Continued)

(58) Field of Classification Search
CPC .... F25B 49/027; F25B 23/006; F25B 25/005; F25B 2600/111; F25B 2600/2501;
(Continued)

(56) References Cited

U.S. PATENT DOCUMENTS

| 4,257,238 A | 3/1981 | Kountz et al. |
| 5,970,729 A | 10/1999 | Yamamoto et al. |

(Continued)

FOREIGN PATENT DOCUMENTS

| CN | 101506044 A | 8/2009 |
| CN | 102410664 A | 4/2012 |

(Continued)

OTHER PUBLICATIONS

Korean Office Action for KR Application No. 10-2019-7008326 dated Mar. 30, 2020, 8 pgs.

(Continued)

*Primary Examiner* — Kun Kai Ma
(74) *Attorney, Agent, or Firm* — Fletcher Yoder, P.C.

(57) ABSTRACT

A refrigeration system includes a heat exchanger configured to place a cooling fluid in a heat exchange relationship with a working fluid, a free-cooling circuit having a pump configured to circulate the working fluid through the heat exchanger and a condenser, a flow control valve configured to control a flow rate of the working fluid to the condenser, a condenser bypass valve configured to control a flow rate of the working fluid that bypasses the condenser, and a controller configured to adjust a position of the flow control valve, a position of the condenser bypass valve, a speed of a fan of the condenser, a speed of the pump, and a tempera- (Continued)

ture of a heater based on an ambient temperature, a temperature of the working fluid leaving the condenser, the position of the flow control valve, the position of the condenser bypass valve, or a combination thereof.

19 Claims, 10 Drawing Sheets

(52) U.S. Cl.
CPC .. *F25B 2400/0403* (2013.01); *F25B 2600/111* (2013.01); *F25B 2600/13* (2013.01); *F25B 2600/2501* (2013.01); *F25B 2600/2515* (2013.01); *Y02B 30/70* (2013.01)

(58) Field of Classification Search
CPC ...... F25B 2600/2505; F25B 2600/2515; F25B 2600/13; F25B 2400/0403; F25B 2400/13; Y02B 30/70
See application file for complete search history.

(56) References Cited

U.S. PATENT DOCUMENTS

| | | | |
|---|---|---|---|
| 6,047,770 A * | 4/2000 | Suzuki | B60L 1/003 165/202 |
| 6,155,062 A | 12/2000 | Santarnecchi | |
| 6,347,528 B1 * | 2/2002 | Iritani | B60L 3/0046 62/324.6 |
| 6,640,561 B2 | 11/2003 | Roberto | |
| 7,036,330 B2 | 5/2006 | Grabon et al. | |
| 7,581,409 B2 | 9/2009 | Bailey et al. | |
| 9,179,574 B2 | 11/2015 | Canney et al. | |
| 2002/0184908 A1 * | 12/2002 | Brotz | H01M 8/04007 62/259.2 |
| 2008/0041071 A1 * | 2/2008 | Itoh | F28D 7/0025 62/79 |
| 2010/0078160 A1 | 4/2010 | Novotny et al. | |
| 2010/0186440 A1 * | 7/2010 | Hong | F28D 7/103 62/434 |
| 2010/0192606 A1 * | 8/2010 | Isayama | F24D 3/18 62/235.1 |
| 2010/0242532 A1 * | 9/2010 | Kopko | F25B 41/00 62/498 |
| 2011/0113800 A1 * | 5/2011 | Sekiya | B60L 1/003 62/151 |
| 2011/0192188 A1 * | 8/2011 | Nickey | F28B 1/06 62/507 |
| 2012/0125023 A1 | 5/2012 | Kopko et al. | |
| 2012/0291897 A1 * | 11/2012 | Ridao | F25B 45/00 137/613 |
| 2014/0202178 A1 * | 7/2014 | Trumbower | B60L 50/16 62/62 |
| 2014/0230467 A1 | 8/2014 | Noll et al. | |
| 2014/0260391 A1 * | 9/2014 | Kopko | F25B 6/02 62/238.6 |
| 2015/0285539 A1 * | 10/2015 | Kopko | F25B 41/04 62/115 |
| 2015/0345846 A1 * | 12/2015 | Kopko | F25B 49/02 62/115 |
| 2016/0076821 A1 * | 3/2016 | Kopko | F25B 7/00 165/10 |
| 2017/0021700 A1 * | 1/2017 | Smith | B60H 1/3225 |
| 2017/0197490 A1 * | 7/2017 | Enomoto | B60H 1/00899 |
| 2017/0227263 A1 * | 8/2017 | Kopko | F25B 25/005 |
| 2017/0361677 A1 * | 12/2017 | Kim | B60L 58/24 |
| 2019/0293326 A1 * | 9/2019 | Chamoun | F25B 41/00 |

FOREIGN PATENT DOCUMENTS

| | | |
|---|---|---|
| CN | 202757369 U | 2/2013 |
| DE | 102009045719 A1 | 4/2011 |
| EP | 1134523 A1 | 9/2001 |
| EP | 1855070 A2 | 11/2007 |
| EP | 2233863 A2 | 9/2010 |
| JP | 20040132651 A | 4/2004 |
| JP | 2011012904 A | 1/2011 |
| JP | 2013119990 A | 6/2013 |
| WO | 2009009164 A1 | 1/2009 |

OTHER PUBLICATIONS

Japanese Office Action for JP Application No. 2019-510795 dated Jun. 2, 2020, 6 pgs.
Climaveneta Sustainable Comfort, Formula Free Cooling Line, Air Source Chiller Featuring Free Cooling Function, with Scroll and Screw Compressors, From 40 to 1321 kw, Mar. 2012, pp. 1-16.
Free cooling on RTAF Chiller, PowerPoint, Jan. 2015, pp. 1-10, http://www.tranebelgium.com/files/product-doc/298/fr/RTAF-Free-Cooling.pdf.
International Search Report and Written Opinion for PCT Application No. PCT/US2017/048048 dated Nov. 2, 2017.
Chinese Office Action for CN Application No. 201780064675.4 dated Sep. 3, 2020, 6 pgs.
Japanese Notice of Allowance for JP Application No. 2019-510795 dated Oct. 23, 2020, 3 pgs.

\* cited by examiner

SYSTEMS AND METHODS FOR CONTROLLING A REFRIGERATION SYSTEM

CROSS REFERENCE TO RELATED APPLICATION

This application claims the benefit of and priority from U.S. Provisional Patent Application Ser. No. 62/378,148, entitled "Systems and Methods for Controlling a Refrigeration System," filed Aug. 22, 2016, which is hereby incorporated by reference in its entirety.

BACKGROUND

The present disclosure relates generally to a refrigeration system. Specifically, the present disclosure relates to a refrigeration system that includes a free cooling system and a mechanical cooling system.

Refrigeration systems are used in a variety of settings and for many purposes. For example, refrigeration systems may include a free cooling system and a mechanical cooling system. In some cases, the free cooling system may include a liquid-to-air heat exchanger, which is used throughout industry and in many heating, ventilating, and air conditioning applications. The latter applications include residential, commercial, and industrial air conditioning systems. Additionally, the mechanical cooling system may be a vapor-compression refrigeration cycle, which may include a condenser, an evaporator, a compressor, and/or an expansion device. In the evaporator, liquid or primarily liquid refrigerant is evaporated by drawing thermal energy from an air flow stream and/or a cooling fluid (e.g., water), which may also flow through the liquid-to-air heat exchanger of the free cooling system. In the condenser, the refrigerant is de-superheated, condensed, and sub-cooled. In some cases, refrigeration systems may adjust a speed of a fan of the liquid-to-air heat exchanger and/or a speed of a compressor in the mechanical cooling system to meet a desired cooling demand.

SUMMARY

In one embodiment, a refrigeration system includes a heat exchanger configured to place a cooling fluid in a heat exchange relationship with a working fluid, a free-cooling circuit having a pump, where the pump is configured to circulate the working fluid through the heat exchanger and a condenser of the free-cooling circuit, a flow control valve of the free-cooling circuit configured to control a flow rate of the working fluid directed to the condenser of the free-cooling circuit, a condenser bypass valve of the free-cooling circuit configured to control a flow rate of the working fluid that bypasses the condenser of the free-cooling circuit, and a controller configured to adjust a first position of the flow control valve, a second position of the condenser bypass valve, a speed of a fan of the condenser, a speed of the pump, and a temperature of a heater of the free-cooling circuit based on an ambient temperature, a temperature of the working fluid leaving the condenser, the first position of the flow control valve, the second position of the condenser bypass valve, or a combination thereof.

In another embodiment, one or more tangible, non-transitory machine-readable media having processor-executable instructions to receive feedback indicative of an ambient temperature, compare the ambient temperature to a target temperature, close a flow control valve of a free-cooling circuit and open a condenser bypass valve of the free-cooling circuit when the ambient temperature is less than or equal to the target temperature, where the free-cooling circuit is configured to circulate a working fluid through a heat exchanger that places the working fluid in a heat exchange relationship with a cooling fluid, modulate the flow control valve of the free-cooling circuit toward an open position to direct working fluid to the condenser after the flow control valve has been closed for a predetermined amount of time, modulate the condenser bypass valve of the free-cooling circuit toward a closed position when the flow control valve of the free-cooling circuit reaches a fully open position, and modulate a first speed of at least one fan of the condenser of the free-cooling circuit and a second speed of a pump of the free-cooling circuit based on a first temperature of the cooling fluid leaving the heat exchanger, a second temperature of the working fluid leaving the condenser, or a combination thereof, when the condenser bypass valve of the free-cooling circuit reaches a fully closed position.

In an another embodiment, a method includes receiving feedback indicative of an ambient temperature, comparing the ambient temperature to a target temperature, closing a flow control valve of a free-cooling circuit and opening a condenser bypass valve of the free-cooling circuit when the ambient temperature is less than or equal to the target temperature, where the free-cooling circuit is configured to circulate a working fluid through a heat exchanger that places the working fluid in a heat exchange relationship with a cooling fluid, modulating the flow control valve of the free-cooling circuit toward an open position to direct working fluid to the condenser after the flow control valve has been closed for a predetermined amount of time, modulating the condenser bypass valve of the free-cooling circuit toward a closed position when the flow control valve of the free-cooling circuit reaches a fully open position, and modulating a first speed of at least one fan of the condenser of the free-cooling circuit and a second speed of a pump of the free-cooling circuit based on a first temperature of the cooling fluid leaving the heat exchanger, a second temperature of the working fluid leaving the condenser, or a combination thereof, when the condenser bypass valve of the free-cooling circuit reaches a fully closed position.

DRAWINGS

DETAILED DESCRIPTION

Figure 1:
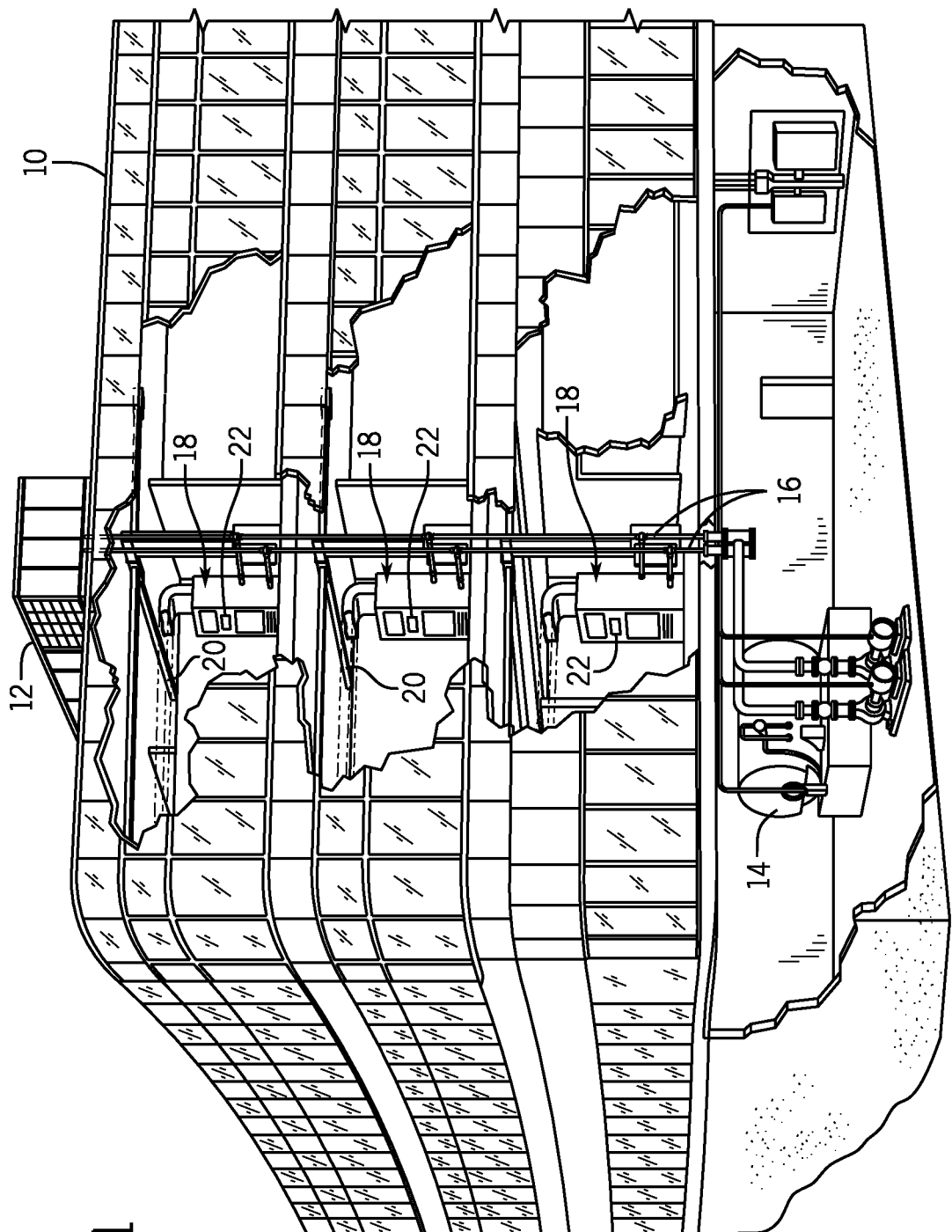
FIG. 1 is perspective view of a commercial or industrial environment that employs a refrigeration system, in accordance with an aspect of the present disclosure.

The present disclosure is directed to an enhanced control system for a refrigeration system that includes a free-cooling system and a mechanical cooling system for cooling a load. As used herein, a free-cooling system may include a system that places a fluid in a heat exchange relationship with ambient air. Accordingly, the free-cooling system may utilize the ambient air in a surrounding environment as a cooling and/or a heating fluid. The refrigeration system may utilize the free-cooling system alone (e.g., free-cooling mode), the mechanical cooling system alone (e.g., mechanical cooling mode), or the free-cooling system and the mechanical cooling system simultaneously (e.g., hybrid cooling mode). To determine which system(s) to operate, the refrigerant system may include various sensors and/or other monitoring devices that measure operating conditions (e.g., speed of fans, speed of a compressor, ambient air temperature, cooling fluid temperature) of the refrigeration system. For example, in accordance with embodiments of the present disclosure, the determination of which system(s) to operate may depend at least on a desired cooling load demand (e.g., a desired temperature of the load) and/or an ambient air temperature (e.g., a temperature of a surrounding environment of the refrigeration system).

Typically, refrigeration systems increase an air flow of the free-cooling system to a maximum air flow before operating the mechanical cooling system because it is generally believed that the free-cooling system consumes less power than the mechanical cooling system (e.g., a compressor of a vapor-compression refrigeration cycle). For example, a free-cooling system may include one or more fans that direct air toward a coil of a heat exchanger to cool a cooling fluid flowing through the coil. In order for the fans to operate, power is supplied to the one or more fans such that the air may flow over the coil and absorb heat from the cooling fluid. An amount of free-cooling performed by the free-cooling system may be adjusted by controlling a coil bypass valve with a number of fixed-speed fans running.

A mechanical cooling system may include one or more vapor-compression refrigeration cycles, where each vapor-compression refrigeration cycle includes an evaporator, a compressor, a condenser, and/or an expansion device. Refrigerant may be directed through the mechanical cooling system (e.g., a refrigerant loop) via the compressor, which may also be powered by a variable speed drive. The variable speed drive coupled to the compressor may enable control over a speed of the compressor, and thus an amount of cooling performed by the vapor-compression refrigeration cycle.

Typically, refrigeration systems operate a free-cooling system at maximum capacity (e.g., a maximum fan speed) before supplying power to the compressor of the mechanical cooling system because it is believed that the fans of the free cooling system consume less power than the compressor of the mechanical cooling system. Additionally, traditional refrigeration systems may continue to operate the free-cooling system at maximum capacity (e.g., at the maximum fan speed) when power is supplied to one or more compressors of the mechanical cooling system. Present embodiments seek to minimize an amount of power input to the overall refrigeration system (e.g., the free-cooling system and the mechanical cooling system) by increasing a speed of the fan of the free-cooling system up to a threshold speed, where the threshold speed is below a maximum speed of the fan (e.g., a speed that the fan cannot physically exceed). In some cases, when the fan reaches the threshold speed (or before the fan reaches the threshold speed), power may be supplied to the compressor of the mechanical cooling system. Operating the refrigeration system in such a manner may minimize an amount of power supplied to the system, thereby enhancing an efficiency of the refrigeration system.

Turning now to the figures, FIG. 1 depicts an exemplary application for a refrigeration system. Such systems, in general, may be applied in a range of settings, both within the heating, ventilating, air conditioning, and refrigeration (HVAC&R) field and outside of that field. The refrigeration systems may provide cooling to data centers, electrical devices, freezers, coolers, or other environments through vapor-compression refrigeration, absorption refrigeration, and/or thermoelectric cooling. In presently contemplated applications, however, refrigeration systems may also be used in residential, commercial, light industrial, industrial, and in any other application for heating or cooling a volume or enclosure, such as a residence, building, structure, and so forth. Moreover, the refrigeration systems may be used in industrial applications, where appropriate, for basic refrigeration and heating of various fluids.

FIG. 1 illustrates an exemplary application, in this case a heating, ventilating, air conditioning, and refrigeration system (HVAC&R) for building environmental management that may employ one or more heat exchangers. For example, a building 10 is cooled by a system that includes a refrigeration system 12 and a boiler 14. As shown, the refrigeration system 12 is disposed on the roof of the building 10 and the boiler 14 is located in the basement; however, the refrigeration system 12 and the boiler 14 may be located in other equipment rooms or areas next to the building 10. The refrigeration system 12 is an air cooled device and/or a mechanical cooling system that implements a refrigeration cycle to cool water (or another cooling fluid, such as glycol). The refrigeration system 12 is housed within a single structure that may include a mechanical cooling circuit, a free cooling system, and associated equipment such as pumps, valves, and piping. For example, the refrigeration system 12 may be single package rooftop unit that incorporates a free cooling system and a mechanical cooling system. The boiler 14 is a closed vessel that includes a furnace to heat water. The water (or another cooling fluid) from the refrigeration system 12 and the boiler 14 is circulated through the building 10 by water conduits 16. The water conduits 16 are routed to air handlers 18, located on individual floors and within sections of building 10.

The air handlers 18 are coupled to ductwork 20 that is adapted to distribute air between the air handlers 18 and may receive air from an outside intake (not shown). The air handlers 18 include heat exchangers that circulate cold water from the refrigeration system 12 and hot water from the boiler 14 to provide heated or cooled air. Fans, within the air handlers 18, draw air across coils of the heat exchangers and direct the conditioned air to environments within the building 10, such as rooms, apartments, or offices, to maintain the environments at a designated temperature. A control device, shown here as including a thermostat 22, may be used to designate the temperature of the conditioned air. The control device 22 may also be used to control the flow of air through and from the air handlers 18. Other devices may, of course, be included in the system, such as control valves that regulate the flow of water and pressure and/or temperature transducers or switches that sense the temperatures and pressures of the water, the air, and so forth. Moreover, the control devices may include computer systems that are integrated with and/or separate from other building control or monitoring systems, including systems that are remote from the building 10. It should be noted that while water is discussed as a cooling fluid, any suitable cooling fluid may be utilized in the refrigeration system 12.

Figure 2:
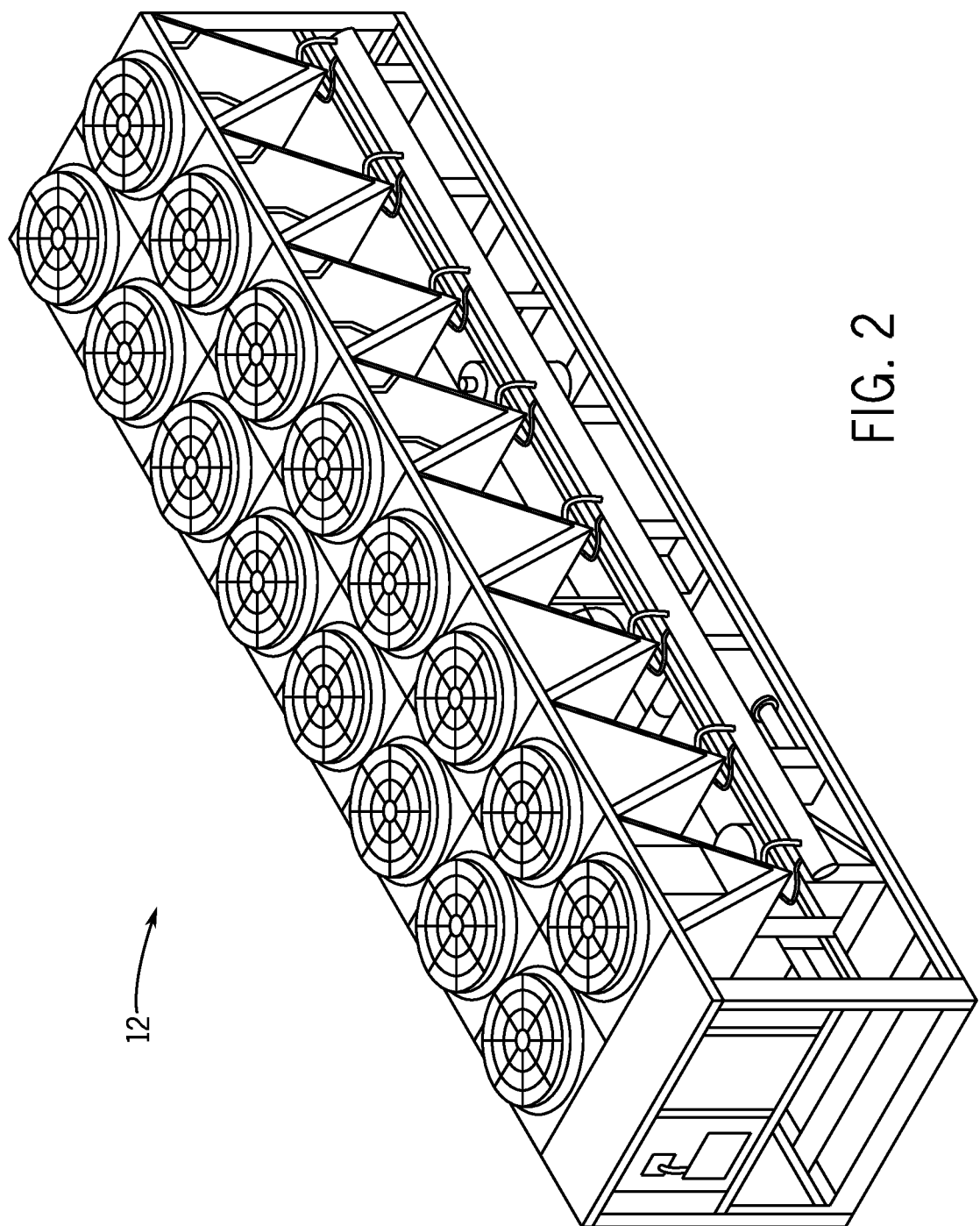
FIG. 2 is a perspective view of the refrigeration system of FIG. 1 that may include both a free cooling system and a mechanical cooling system to enhance efficiency of the refrigeration system, in accordance with an aspect of the present disclosure.

In accordance with embodiments of the present disclosure, the refrigeration system 12 may include a mechanical cooling system that may be modified and/or enhanced to include a free cooling system. For example, FIG. 2 is a perspective view of the refrigeration system 12 that may include both a mechanical cooling system (e.g., a vapor-compression refrigeration cycle) and a free cooling system to enhance an efficiency of the overall refrigeration system 12. In certain embodiments, the mechanical cooling system of the refrigeration system 12 may be an air-cooled variable-speed screw chiller similar to that of a YVAA chiller, as made available by Johnson Controls Incorporated. For example, the mechanical cooling system may be a two-circuit, variable-speed screw chiller with variable speed condenser fans (e.g., fans that may be used with one or more air-cooled heat exchangers). Additionally, the refrigeration system 12 may include a free-cooling system that may be utilized alone, or in combination with, the mechanical cooling system (e.g., a vapor-compression refrigeration cycle).

In certain embodiments, the refrigeration system 12 may include a control system configured to determine whether (and how) to operate the mechanical cooling system and/or the free cooling system based on a temperature of ambient air (e.g., air in a surrounding environment of the refrigeration system) and/or a cooling load demand (e.g., an amount of cooling demanded by a load). Accordingly, the refrigeration system 12 may operate the mechanical cooling system only (e.g., mechanical cooling mode), the free cooling system only (e.g., free cooling mode), or the mechanical cooling system and the free cooling system simultaneously (e.g., hybrid cooling mode) to meet the cooling load demand.

As discussed above, it may be desirable to minimize an amount of energy input to a refrigeration system 12 to maximize an efficiency of the refrigeration system 12. In typical refrigeration systems, a speed of a fan of a free cooling system may be maximized before a compressor of a mechanical cooling system is activated in order to achieve a desired cooling load. However, it is now recognized that activating the mechanical cooling system compressor before a maximum speed of the fan is reached may consume less energy than operating the fan at its maximum speed before activating the mechanical cooling system compressor.

Figure 3:
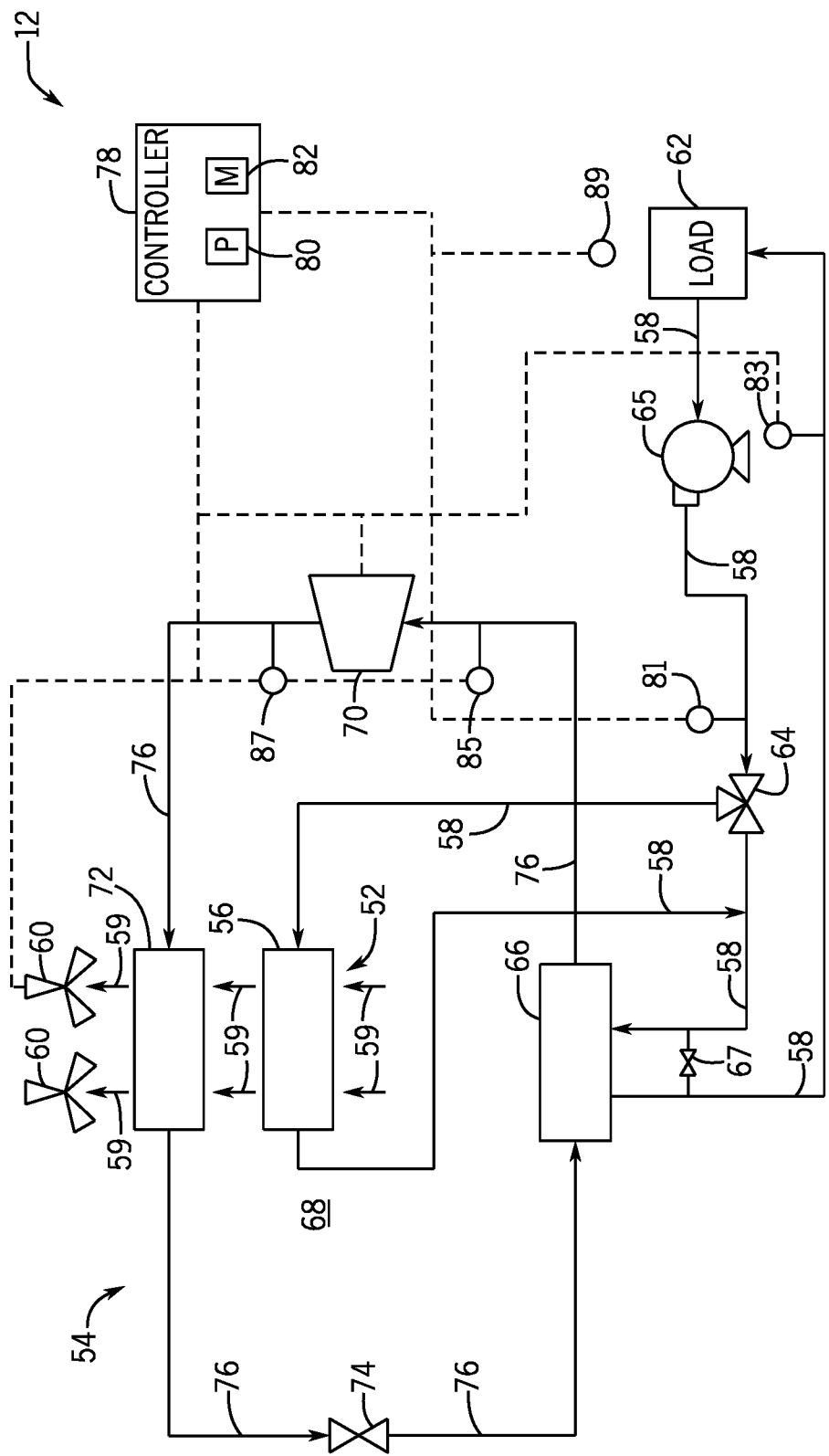
FIG. 3 is a block diagram of an embodiment of a refrigeration system, in accordance with an aspect of the present disclosure.

For example, FIG. 3 is a block diagram of the refrigeration system 12 that may be utilized in accordance with embodiments of the present disclosure. As shown in the illustrated embodiment, the refrigeration system 12 includes a free cooling system 52 and a mechanical cooling system 54 (e.g., one or more vapor-compression refrigeration cycles).

The free cooling system 52 may include an air-cooled heat exchanger 56 that may receive and cool a cooling fluid 58 (e.g., water and/or glycol). For example, the air-cooled heat exchanger 56 may be located along an air flow path 59 created by one or more fans 60 that direct air over coils of the air-cooled heat exchanger 56. When ambient air is at a relatively low temperature, the air directed over the coils may absorb heat from the cooling fluid 58, thereby decreasing a temperature of the cooling fluid 58 and increasing a temperature of the ambient air flowing over the coils of the air-cooled heat exchanger 56. In certain embodiments, the cooling fluid 58 may be received by the air-cooled heat exchanger 56 from a load 62. Therefore, the cooling fluid 58 may ultimately be re-directed toward the load 62 to lower a temperature of the load 62 (e.g., air or fluid that may be directed through a building or a machine).

However, the free cooling system 52 may not be as effective when the temperature of the ambient air is relatively high. For example, an amount of heat transfer occurring between the cooling fluid 58 and the ambient air in the air-cooled heat exchanger 56 may decrease as the temperature of ambient air increases (e.g., the ambient air may not absorb as much heat from the cooling fluid 58 when the ambient air is relatively warm). Therefore, the refrigeration system 12 may include a three-way valve 64 that controls an amount of the cooling fluid 58 that may flow toward the free cooling system 52. For example, the three-way valve 64 may block the cooling fluid 58 from flowing directly toward an evaporator 66 of the mechanical cooling system 54 and simultaneously enable flow through the air-cooled heat exchanger 56 when ambient air temperature is sufficiently below a temperature of the cooling fluid 58 returning from the load 62, such that free-cooling supplies at least a portion of the cooling load demand. The cooling fluid 58 may then flow through the evaporator 66, which can further cool the cooling fluid 58.

As shown in the illustrated embodiment of FIG. 3, the three-way valve 64 may receive the cooling fluid 58 from a pump 65 and select between directing a flow of the cooling fluid 58 toward the evaporator 66 directly from the load 62 or toward the evaporator 66 from the air-cooled heat exchanger 56. In certain embodiments, the three-way valve 64 may include a tee and two, two-way butterfly valves mechanically coupled to an actuator that may adjust a position of the valves (e.g., one butterfly valve opens when the other closes). It should be noted that while the three-way valve 64 is located upstream of the air-cooled heat exchanger 56 in the embodiment of FIG. 3, the three-way valve 64 may be located downstream of the air-cooled heat exchanger 56 in other embodiments. In still further embodiments, the three-way valve 64 may be configured to simultaneously supply and control a flow of the cooling fluid 58 to the air-cooled heat exchanger 56 and to the evaporator 66 directly from the load 62.

When free cooling is able to provide substantially all of the cooling load demand (e.g., when ambient air temperature is below a threshold temperature), the mechanical cooling system 54 does not operate. As such, the cooling fluid 58 flows through the evaporator 66 without experiencing a substantial temperature change (e.g., substantially no heat is transfer from the cooling fluid 58 in the evaporator 66). In some embodiments, the refrigeration system 12 may include a bypass valve 67 to enable the cooling fluid 58 (or a portion of the cooling fluid 58) to bypass the evaporator 66. In certain embodiments, bypassing the evaporator 66 may substantially avoid a pressure drop experienced by the cooling fluid 58 when flowing through the evaporator 66.

When free cooling is unable to provide substantially all of the cooling load demand, the mechanical cooling system 54 may be initiated (e.g., operated either alone or simultaneously with the free cooling system 52). In certain embodiments, the mechanical cooling system 54 may be a vapor-compression refrigeration cycle 68 that includes the evaporator 66, a compressor 70, a condenser 72, and/or an expansion device 74, among other components. For example, the mechanical cooling system 54 may be configured to circulate a refrigerant 76, which may be evaporated (e.g., vaporized) in the evaporator 66 via heat transfer with the cooling fluid 58 (e.g., the cooling fluid 58 transfers thermal energy to the refrigerant 76 in the evaporator 66). Therefore, heat may be transferred from the cooling fluid 58 to the refrigerant 76 within the evaporator 66, thereby decreasing a temperature of the cooling fluid 58 (e.g., either in lieu of or in addition to the free cooling system 52). In certain embodiments, the cooling fluid 58 and/or the refrigerant 76 may include glycol (or a mixture of glycol and water). In some embodiments, one or more sets of coils of the condenser 72 may include micro-channel coils.

The air-cooled heat exchanger 56 may include round-tube plate-fin coils with internally enhanced tubes and louvered fins to improve heat transfer. The evaporator 66 may be a brazed-plate, direct-expansion (DX) shell-and-tube heat exchanger, a flooded shell-and-tube heat exchanger, a falling film shell-and-tube heat exchanger, a hybrid falling-film and flooded heat exchanger, or any combination thereof. For embodiments that utilize DX evaporators, the refrigerant is on the tube side and the refrigerant may make multiple passes through the evaporator (e.g., two, three, four or more). For embodiments that utilize evaporators with refrigerant on the shell-side, water or glycol may flow through tubes in with one, two, three, or more passes.

The refrigerant 76 exiting the evaporator 66 may flow toward the compressor 70, which is configured to circulate the refrigerant through the vapor-compression refrigeration cycle 68. Additionally, the compressor 70 may increase a pressure of the refrigerant 76 as the refrigerant 76 circulates (e.g., cycles) through the vapor-compression refrigeration cycle 68. Increasing the pressure of the refrigerant 76 may also increase the temperature of the refrigerant 76, such that the temperature of the refrigerant 76 exiting the compressor 70 is greater than the temperature of the refrigerant 76 entering the compressor 70. Accordingly, it may be desirable to decrease the temperature of the refrigerant 76 so that it may ultimately absorb heat from the cooling fluid 58 in the evaporator 66.

Therefore, the refrigerant 76 exiting the compressor 70 may flow toward the condenser 72. In certain embodiments, the condenser 72 of the mechanical cooling system 54 may be an air-cooled heat exchanger, similar to the air-cooled heat exchanger 56 of the free cooling system 52. In embodiments where the condenser 72 is an air-cooled heat exchanger, the condenser 72 may share the fans 60 with the air-cooled heat exchanger 56. As shown in the illustrated embodiment of FIG. 3, the condenser 72 may be located downstream of the air-cooled heat exchanger 56 with respect to the air flow path 59 so that the cooling fluid 58 may approach the ambient temperature during free cooling. In other embodiments, the condenser 72 may include fans 77 separate from the fans 60 (e.g., FIGS. 4 and 5). In still further embodiments, the condenser 72 of the mechanical cooling system 54 may be any suitable heat exchanger configured to transfer heat from the refrigerant 76 to another medium (e.g., water, air). In any case, the condenser 72 is configured to decrease a temperature of the refrigerant 76 and generally liquefy (e.g., condense) the refrigerant 76.

In certain embodiments, the mechanical cooling system 54 may also include the expansion device 74, which may further decrease a temperature of the refrigerant 76, as well as decrease the pressure of the refrigerant 76. The expansion device 74 may include an expansion valve, a flash tank, an expansion coil, or any other device configured to decrease a pressure of the refrigerant 76 (and decrease a temperature of the refrigerant 76). In other embodiments, the mechanical cooling system 54 may not utilize the expansion device 74.

As discussed above, the cooling fluid 58 may decrease in temperature by flowing through the free cooling system 52 and/or the evaporator 66 of the mechanical cooling system 54. However, when a cooling load demand (e.g., a predetermined and/or desired temperature of the load 62 and/or a predetermined temperature of the cooling fluid 58 exiting the evaporator 66) exceeds an amount that the free cooling system 52 may provide alone, the free cooling system 52 and the mechanical cooling system 54 may operate simultaneously (e.g., a hybrid cooling mode). Accordingly, the cooling fluid 58 may be directed toward the air-cooled heat exchanger 56 of the free cooling system 52, where the cooling fluid 58 may decrease in temperature from a first temperature to a second temperature (e.g., the second temperature is less than the first temperature). Additionally, the cooling fluid 58 may be directed toward the evaporator 66 of the mechanical cooling system 54 upon exiting the air-cooled heat exchanger 56. The cooling fluid 58 may further decrease in temperature from the second temperature to a third temperature (e.g., the third temperature is less than the second temperature, and thus, the first temperature) during the hybrid cooling mode. Upon exiting the evaporator 66, the cooling fluid 58 may be directed toward the load 62, where the cooling fluid 58 may be utilized to cool the load 62.

In certain embodiments, a first portion of the cooling fluid 58 may be directed toward the air-cooled heat exchanger 56 of the free cooling system, while a second portion of the cooling fluid 58 may be directed toward the evaporator 66 of the mechanical cooling system 54 (e.g., via the three-way valve 64). In other embodiments, generally all of the cooling fluid 58 may either flow through the air-cooled heat exchanger 56 before entering the evaporator 66 or directly flow through evaporator 66.

The refrigeration system 12 may include a controller 78 that may adjust a position of the three-way valve 64, a position of the bypass valve 67, a speed of the one or more fans 60, a speed of the one or more fans 77 (e.g., FIG. 5), a speed of the compressor 70, and/or any other operating conditions that may affect a temperature of the cooling fluid 58 supplied to the load 62. Accordingly, the refrigeration system 12 may include one or more sensors that may monitor the operating conditions of the refrigeration system 12. For example, the refrigeration system 12 may include a return cooling fluid temperature sensor 81, a supply cooling fluid temperature sensor 83, a suction pressure sensor 85, a discharge pressure sensor 87, and/or an ambient temperature sensor 89. The temperature and/or pressure sensors may provide feedback to the controller 78, which may then adjust a position of the three-way valve 64, a position of the valve 67, a speed of the one or more fans 60, a speed of the one or more fans 77 (FIG. 5), and/or a speed of the compressor 70 based on the feedback received from the one or more sensors.

In certain embodiments, the controller 78 may include a processor 80 and a memory 82. For example, the controller 78 may include non-transitory code or instructions stored in a machine-readable medium (e.g., the memory 82) that is used by a processor (e.g., the processor 80) to implement the techniques disclosed herein. The memory 82 may store computer instructions that may be executed by the processor 80. Additionally, the memory 82 may store experimental data and/or other values relating to predetermined operating conditions of the refrigeration system 12. The controller 78 may monitor and control the operation of the refrigeration system 12, for example, by adjusting a position of the three-way valve 64, a position of the valve 67, a speed of the one or more fans 60, a speed of the one or more fans 77, and/or a speed of the compressor 70 based on the feedback received from the one or more sensors. The controller 78 of the refrigeration system 12 may be configured to perform instructions that may enhance an efficiency of the refrigeration system 12. Such instructions are discussed in more detail herein with reference to FIG. 6.

Figure 4:
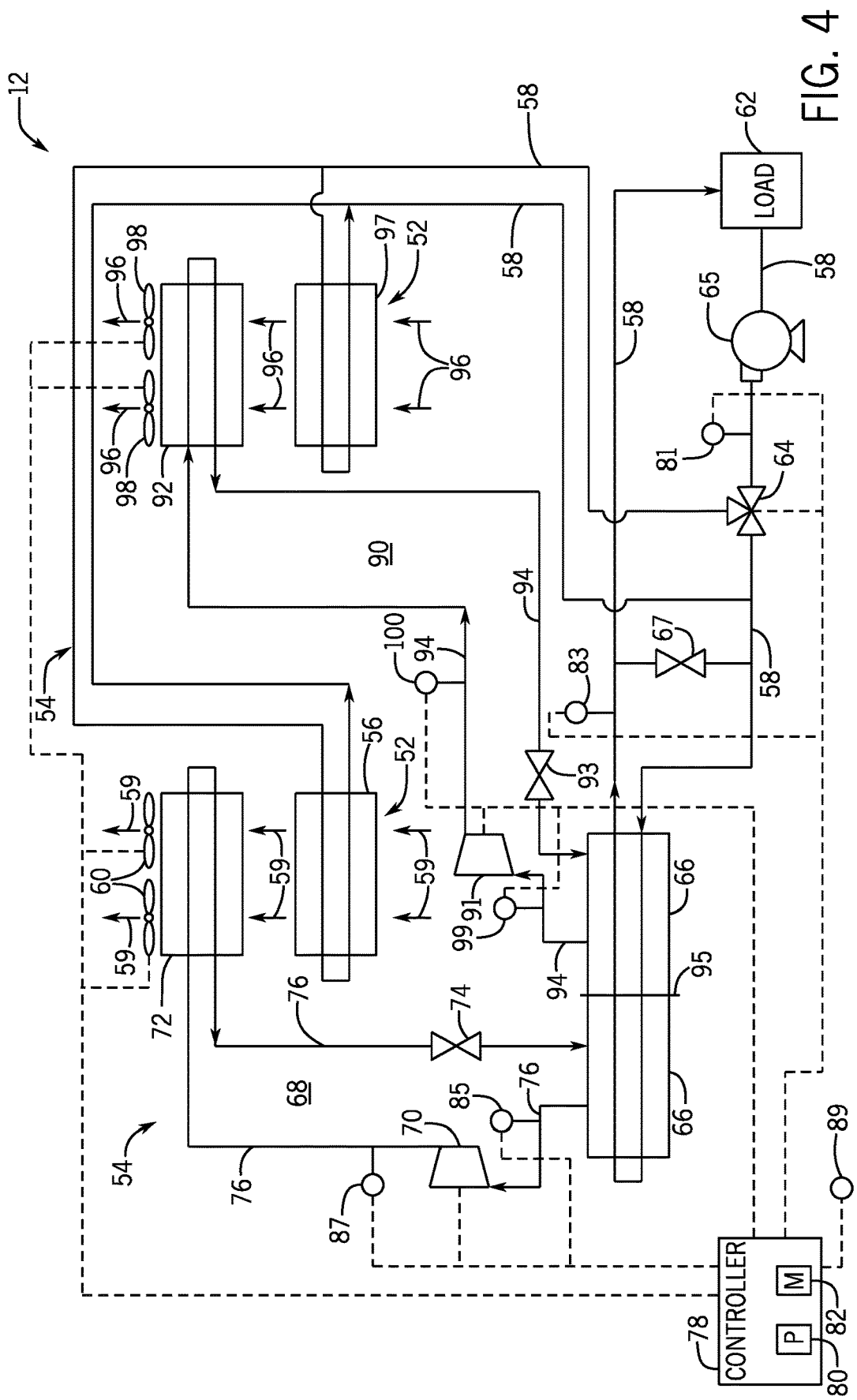
FIG. 4 is a block diagram of an embodiment of a refrigeration system that includes an additional mechanical cooling system, in accordance with an aspect of the present disclosure.

FIG. 4 is a block diagram of the refrigeration system 12 where the mechanical cooling system 54 includes a second vapor compression refrigeration cycle 90. The second vapor compression refrigeration cycle 90 may include a second compressor 91, a second condenser 92, and a second expansion device 93. Additionally, the second vapor compression refrigeration cycle 90 may be configured to direct a refrigerant 94 through the evaporator 66 to provide additional cooling when the cooling load demand is relatively high. The second vapor compression refrigeration cycle 90 may be configured to operate in substantially the same manner as the vapor compression refrigeration cycle 68 to provide cooled refrigerant 94 to the evaporator 66, where the cooled refrigerant 94 may absorb heat from the cooling fluid 58. In some embodiments, the refrigerant 94 may be the same fluid as the refrigerant 76 (e.g., water, glycol, and/or a mixture of water and glycol). In other embodiments, the refrigerant 94 may be different than the refrigerant 76.

As shown in FIG. 4, the two refrigerant circuits 68 and 90 share a single evaporator 66. In this embodiment the evaporator 66 includes a shell-and-tube heat exchanger with refrigerant on a shell-side and water or glycol on a tube-side. A partition 95 separates the two refrigerant circuits 68 and 90 and serves as a tube sheet between the two circuits 68 and 90. In other embodiments, DX evaporators or brazed-plate evaporators may be utilized when multiple refrigerant circuits 68 and 90 are included in the refrigeration system 12.

As shown in the illustrated embodiment of FIG. 4, the second condenser 92 may be positioned in a separate air flow path 96 from the condenser 72. A second air-cooled heat exchanger 97 may be positioned along the air flow path 96 and share fans 98 with the second condenser 92. In this embodiment, the air stream 59 is drawn from the ambient environment through air-cooled heat exchanger 59, condenser 72, and fans 60 and then discharged upward (e.g., out of the refrigeration system 12). Likewise, the air flow path 96 is drawn from the ambient environment through the second air-cooled heat exchanger 97, the second condenser 92, and the fans 98 and then discharged upward (e.g., out of the refrigeration system 12). In other embodiments, the condenser 72, the second condenser 92, and the air-cooled heat exchanger 56 may be positioned in any suitable arrangement to meet the cooling load demand. In still further embodiments, one or more of the condenser 72, the second condenser 92, and the air-cooled heat exchanger 56 may share fans (e.g., the condenser 72, the second condenser 92, and/or the air-cooled heat exchanger 56 are positioned in the same air flow path) such that ambient air flows through the air-cooled heat exchanger 56, the condenser 72, the second condenser 92, and the fans 60 in a series flow configuration.

Additionally, the controller 78 may be communicatively coupled to a second suction pressure sensor 99 and a second discharge pressure sensor 100 to monitor a pressure of the refrigerant 94 entering and exiting the second compressor 91. In some embodiments, the pressure of the refrigerant 94 entering and exiting the second compressor 91 may enable the controller 78 to determine whether to increase and/or decrease a speed of the second compressor 91.

Figure 5:
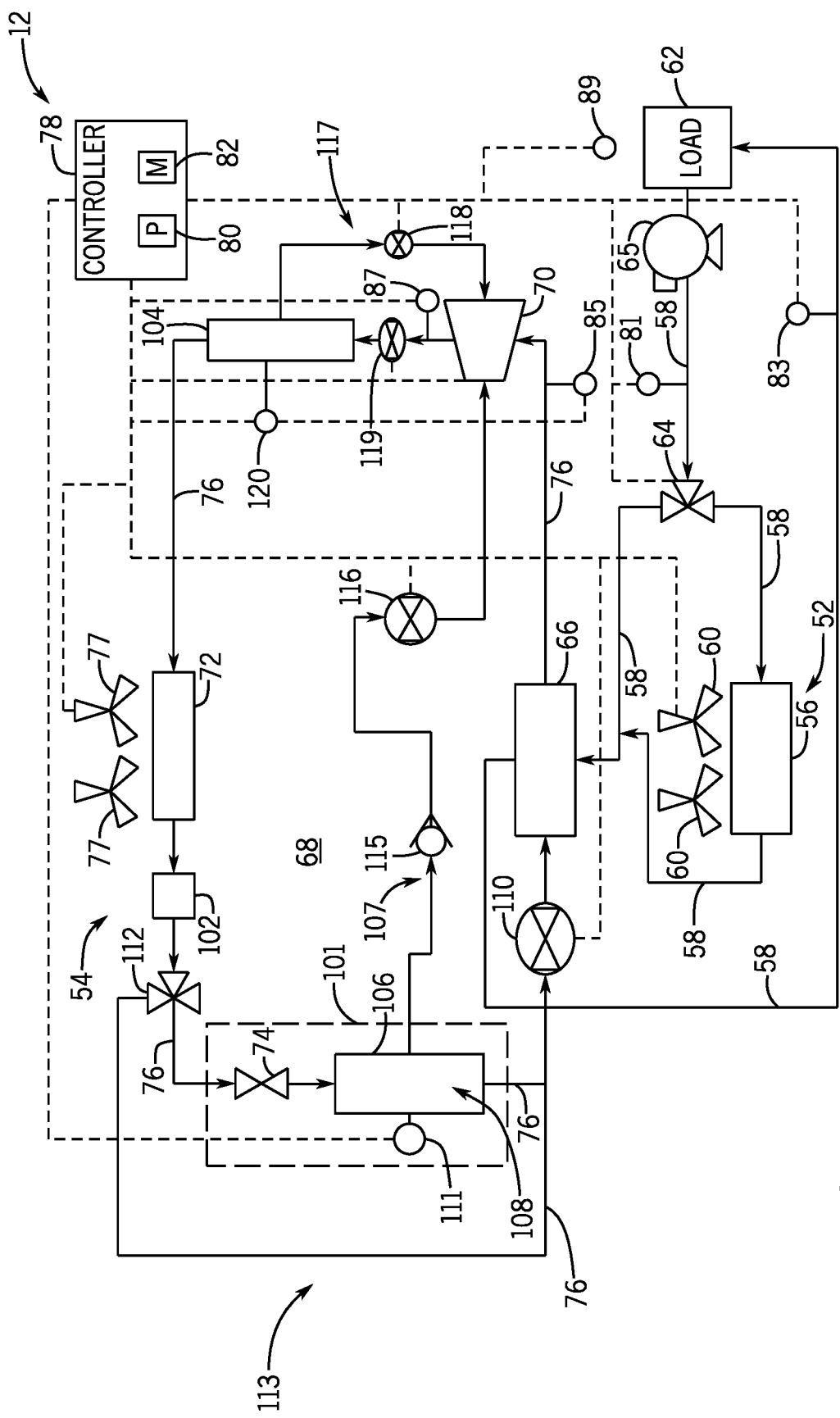
FIG. 5 is a block diagram of a refrigeration system that includes an economizer, a filter, and additional valves, in accordance with an aspect of the present disclosure.

The refrigeration system 12 may additionally include an economizer 101, a filter 102, an oil separator 104 and/or additional valves that may provide enhanced control and ability to cool the load 62, and thereby enhance the efficiency of the refrigeration system 12. For example, FIG. 5 is a block diagram of the refrigeration system 12 that includes such additional devices. As shown in the illustrated embodiment of FIG. 5, the vapor compression refrigeration cycle 68 includes the economizer 101. The economizer 101 may include the expansion device 74 as well as a flash tank 106. In certain embodiments, the flash tank 106 may receive the refrigerant 76 from the expansion device 74 at a relatively low pressure and low temperature. The flash tank 106 may be a vessel that is configured to rapidly lower the pressure of the refrigerant 76 even further to separate any vaporous refrigerant from condensed refrigerant. Accordingly, a first portion of the refrigerant 76 may vaporize (e.g., change from liquid to vapor) as a result of the rapid expansion within the flash tank 106. In some embodiments, the first portion of the refrigerant 76 that vaporizes may bypass the evaporator 66 and be directed toward the compressor 70 via a bypass circuit 107. Additionally, a second portion of the refrigerant 76 may remain in liquid form and collect at a bottom 108 of the flash tank 106. In some embodiments, a valve 110 may be included downstream of the flash tank 106 and upstream of the evaporator 66, such that a flow of the second portion of refrigerant 76 may be adjusted based on other operating conditions of the refrigeration system 12. For example, when the condenser 72 reduces a temperature of the refrigerant 76 to a level such that the first portion exiting the flash tank 106 is substantially less than the second portion, the valve 110 may be adjusted to increase the flow of the second portion of the refrigerant 76 directed toward the evaporator 66 so that more refrigerant 76 is evaporated in the evaporator 66 and directed toward the compressor 70.

Additionally, the flash tank 106 may include a liquid level sensor 111 that may monitor an amount of the second portion of the refrigerant 76 (e.g., liquid portion) collected in the bottom 108 of the flash tank 106. The liquid level sensor 111 may be communicatively coupled to the controller 78 to provide feedback to the controller 78 regarding the amount of liquid collected in the flash tank 106. In certain embodiments, the controller 78 may be configured to perform an output, function, or command based on the feedback received from the liquid level sensor 111. For example, in certain embodiments, a three-way valve 112 may be located between the condenser 72 and the economizer 101. Therefore, when the liquid level in the flash tank 106 is above a threshold level, the three-way valve 112 may be adjusted to direct the refrigerant 76 toward the evaporator 66 along a bypass circuit 113, thereby bypassing the economizer 101 (e.g., the temperature of the refrigerant is too low, and thus the additional cooling provided by the economizer 101 may not be desired). Additionally, when the liquid level in the flash tank 106 is below a predetermined level, the three-way valve 112 may enable all or a substantial portion of the refrigerant 76 to incur additional cooling in the economizer 101 by closing off the bypass circuit 113.

As shown in the illustrated embodiment of FIG. 5, the vapor compression refrigeration cycle 68 may also include a check valve 115 disposed along the bypass circuit 107 that may block the first portion of the refrigerant 76 from flowing from the compressor 70 toward the flash tank 106. Accordingly, the first portion of the refrigerant 76 (e.g., vaporous refrigerant) may be directed from the flash tank 106 toward the compressor 70, where the pressure of the first portion of the refrigerant 76 may increase. Additionally, the first portion of the refrigerant 76 may be blocked from flowing from the compressor 70 back toward the flash tank 106 because of the check valve 115. Additionally or alternatively, a valve 116 may be included between the flash tank 106 and the compressor 70 such that a flow of the first portion of the refrigerant 76 may be adjusted by the controller 78 (e.g., via an actuator configured to adjust a position of the valve 116). It may be desirable to control the flow of the first portion of the refrigerant 76 from the flash tank 106 toward the compressor 70 because the compressor 70 may include a predetermined capacity (e.g., based on compressor speed) that governs a rate of the refrigerant 76 that may be compressed. Accordingly, when the compressor 70 is near the predetermined capacity, the controller 78 may adjust the valve 116 to decrease a flow rate of the first portion of the refrigerant 76 flowing toward the compressor 70. Similarly, when the compressor is operating generally below capacity, the controller 78 may adjust the valve 116 to increase the flow of the first portion of the refrigerant 76 flowing toward the compressor 70.

Additionally, the vapor compression refrigeration cycle 68 may include the filter 102 that may be utilized to remove contaminants from the refrigerant 76. In certain embodiments, acids and/or oil may become mixed with the refrigerant 76 that cycles through the vapor-compression refrigeration cycle 68. Accordingly, the filter 102 may be configured to remove such contaminants from the refrigerant 76 such that the refrigerant 76 entering the expansion device 74, the flash tank 106, the compressor 70, and/or the evaporator 66 includes minimal contaminants.

The vapor compression refrigeration cycle 68 may also include the oil separator 104, which may be positioned downstream of the compressor 70 and upstream of the condenser 72, for example. The oil separator 104 may be utilized to remove oil that may be collected in the refrigerant 76 when flowing through the compressor 70. Accordingly, any oil removed within the oil separator 104 may be returned from the oil separator 104 to the compressor 70 via a recirculation circuit 117. Additionally, oil removed from the refrigerant 76 may collect within the oil separator 104. As such, a valve 118 may be positioned along the recirculation circuit 117 to control a flow and/or pressure of the oil flowing toward the compressor 70. Therefore, the amount of oil returned to the compressor 70 may be adjusted by the controller 78 (e.g., via an actuator configured to adjust a position of the valve 118). In certain embodiments, the oil separator 104 may be a flash vessel, a membrane separator, or any other device configured to separate oil from the refrigerant 76 (e.g., water and/or glycol).

Additionally, a valve 119 may be positioned between the compressor 70 and the oil separator 104 to control an amount of the refrigerant 76 flowing toward the oil separator 104. In some cases, the oil separator 104 may include an oil level monitoring device (e.g., an oil level sensor 120) that may enable the controller 78 and/or an operator to determine how much oil has collected in the oil separator 104. When an amount of oil in the oil separator 104 exceeds a predetermined threshold level, the controller 78 may adjust a position of the valve 119 to decrease a flow of the refrigerant 76 toward the oil separator 104. In some embodiments, the controller 78 may also adjust a position of the valve 118 to increase the amount of oil returned to the compressor 70 from the oil separator 104. Accordingly, the level of oil in the oil separator 104 may decrease, thereby enabling more of the refrigerant 76 to flow toward the oil separator 104, and thus, toward the condenser 72. While the present discussion focuses on the vapor compression refrigeration cycle 68, it should be noted that the second vapor compression refrigeration cycle 90 may also include an economizer, a filter, an oil separator and/or the additional valves and components discussed with reference to FIG. 5.

Figure 6:
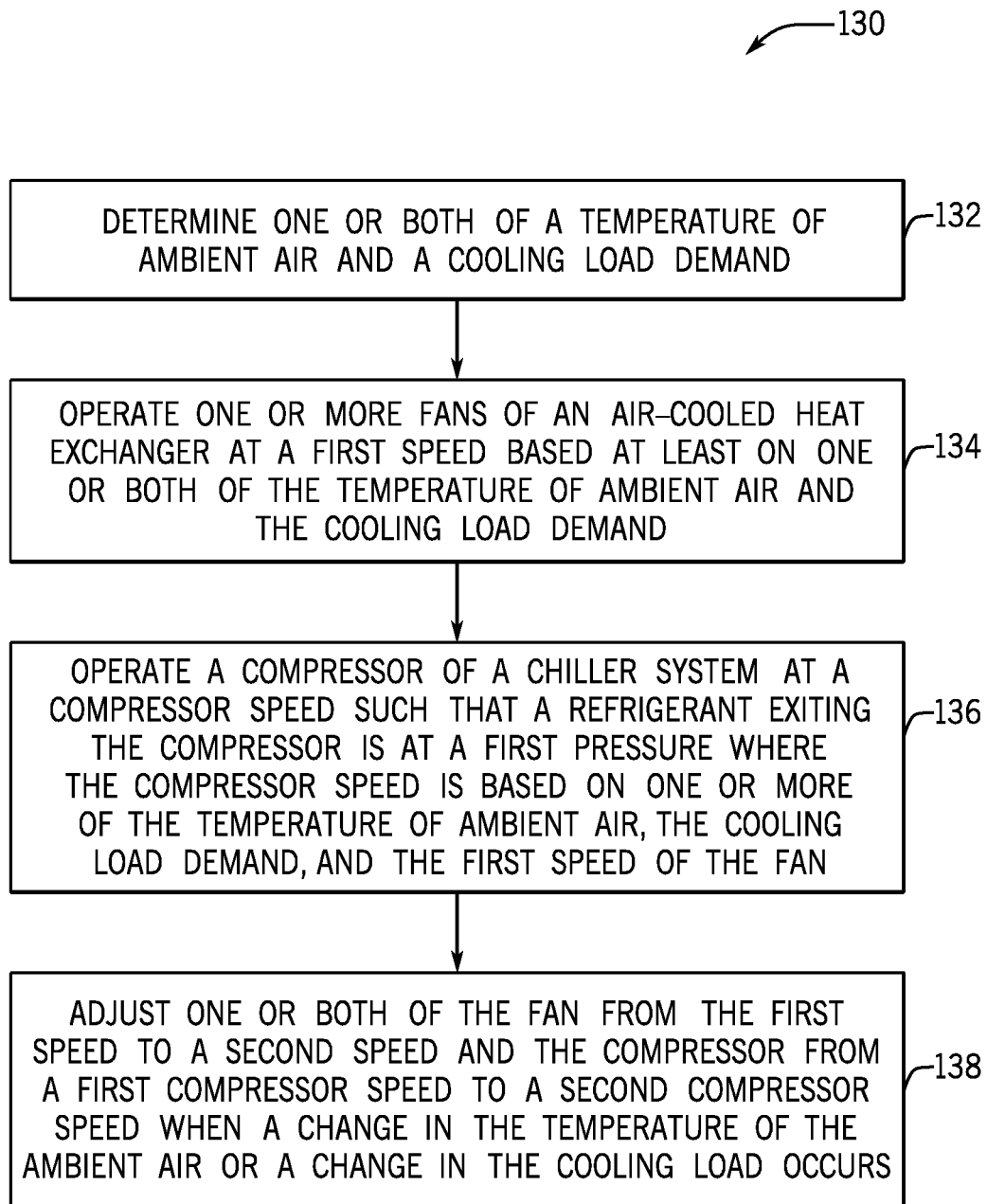
FIG. 6 is a block diagram of a process that may be utilized to enhance the efficiency of a refrigeration system, in accordance with an aspect of the present disclosure.

To enhance an efficiency of the refrigeration system 12, it may be desirable to operate the compressor 70 (and/or the second compressor 91) before the one or more fans 60 reach a maximum speed (e.g., the speed at which the one or more fans 60 cannot spin any faster and/or a predetermined maximum speed specified by the manufacturer). In some cases, operating the compressor 70 (and/or the second compressor 91) before the one or more fans 60 reach the maximum speed may enhance the efficiency of the refrigeration system 12. For example, FIG. 6 is a block diagram of a process 130 that may be utilized to enhance the efficiency of the refrigeration system 12.

At block 132, the controller 78 may determine a temperature of the ambient air (e.g., air in the surrounding environment of the refrigeration system 12) and/or a cooling load (e.g., load 62) demand. For example, the controller 78 may be communicatively coupled to the ambient air temperature sensor 89 that monitors an ambient air temperature. Additionally, the controller 78 may be communicative coupled to the return cooling fluid temperature sensor 81 and/or to the supply cooling fluid temperature sensor 83 to determine a cooling load demand. As used herein, the ambient air temperature may be a temperature of air in an environment surrounding the refrigeration system 12. Additionally, the cooling load demand may be based on a difference between a predetermined or desired temperature of the load 62 (e.g., a temperature received from a user interface) and an actual temperature of the load 62 (e.g., a temperature received from a sensor monitoring the load 62) and/or a temperature difference between a desired temperature of the cooling fluid 58 supplied to or returned from the load 62 (e.g., received from the user interface) and an actual temperature of the cooling fluid 58 supplied to or returned from the load 62 (e.g., a temperature received from the return cooling fluid temperature sensor 82 or the supply cooling fluid temperature sensor 83).

At block 134, the controller 78 may be configured to operate the one or more fans 60 of the air-cooled heat exchanger 56 at a first speed based at least on the temperature of ambient air and/or the cooling load demand. Accordingly, the controller 78 may be configured to calculate (e.g., via the processor 80) the first speed of the fan based on the feedback received from the one or more sensors. The first speed of the one or more fans 60 may increase as the cooling load demand increases and/or as the ambient air temperature increases. Conversely, the first speed may decrease as the cooling load demand decreases (e.g., when the actual temperature of the load is less than the predetermined temperature of the load when cooling) and/or when the ambient air temperature decreases.

In certain embodiments, the one or more fans 60 may include a maximum speed (e.g., a speed at which the one or more fans 60 cannot physically exceed). However, it is now recognized that it may not be desirable to increase the speed of the one or more fans 60 to the maximum speed. Rather, operating and/or increasing a pressure of the compressor 70 when the ambient air temperature increases and/or when the cooling load demand increases may reduce power input to the refrigeration system 12. Therefore, the memory 82 of the controller 78 may be configured to calculate (e.g., using an algorithm) a threshold speed of the one or more fans 60, which may be below the maximum speed of the one or more fans 60. For example, the threshold speed of the one or more fans 60 may be between 50% and 99% of the maximum speed, between 70% and 95% of the maximum speed, or between 80% and 90% of the maximum speed. In some embodiments, the controller 78 may utilize Equation 1 below to calculate the threshold fan speed during free-cooling only mode.

$$\text{Threshold Speed} = \{[d1 \times (\text{ECHLT} - T_{amb})^2] + d0\} \times \text{FanFactor1} \quad (1)$$

In Equation 1, d1 and d0 may represent predetermined factors that are specific to the air-cooled heat exchanger 56. Additionally, ECHLT represents the entering chilled liquid temperature (ECHLT), or the temperature of the cooling fluid 58 directed toward the load 62 from the evaporator 66 (e.g., the temperature received from the supply cooling fluid temperature sensor 83). $T_{amb}$ is the ambient air temperature, and FanFactor1 is a programmable factor that may be specific to the air-cooled heat exchanger 56.

For operation in free-cooling only mode, the controller modulates fan speed to maintain leaving chilled liquid temperature near a predetermined setpoint. As load and/or ambient temperature increase, the controller increases the speed of the fans 60 until they reach the threshold speed. At the threshold speed, the controller 78 may block an increase of the speed of the one or more fans 60 beyond the threshold speed. Any further increase in load or ambient temperature or other operating condition that results in a corresponding increase of the leaving chilled water temperature above the setpoint value causes the controller to initiate operation of one or more compressors. As shown by Equation 1, the threshold speed may be different for various operating conditions (e.g., a different threshold speed for various combinations of ambient air temperature and/or cooling load). The speed of the compressor 70 (and/or the second compressor 91) may be determined by the controller 78 using algorithms known in the art, such that the cooling load demand may be achieved by the refrigeration system 12.

When the one or more fans 60 reach the threshold speed, the controller 78 may also be configured to operate the compressor 70 (and/or the second compressor 91) of the mechanical cooling system 54 at a first compressor speed, as shown at block 136. In certain embodiments, the first compressor speed of the compressor 70 may be a speed that achieves the cooling load demand and also reduces an amount of energy input to the refrigeration system 12 (e.g., a minimum amount of energy is input). Additionally, the controller 78 may be configured to determine a second speed of the one or more fans 60 when the compressor 70 (and/or the second compressor 91) is operating. In other words, when the compressor 70 operates, it may not be desirable to continue operating the one or more fans at the threshold speed. For example, the controller 78 may be configured to determine the second speed based on Equation 2.

$$\text{Second Speed} = b1 \times \text{Unit Total Load Per Fan} + b2 \times \text{FanFactor2} \quad (2)$$

Therefore, the second speed (e.g., the speed of the one or more fans 60 during a hybrid mode of operation) may be based on a unit total load per fan (e.g., an amount of free cooling and mechanical cooling performed by a fan of the one or more fans 60). Accordingly, the controller 78 may be configured to determine the unit total load per fan, which may be based on the entering chilled liquid temperature (ECHLT), the ambient temperature ($T_{amb}$), a free cooling capacity of each fan, a mechanical cooling capacity of each fan, and the number of fans included in the refrigeration system 12, among others. The factors b1, b2, and FanFactor2 may be predetermined to minimize total energy use of the compressor(s) 70 and/or 91 and the fans 60 based on experimental data and/or based on information specific to the refrigeration system 12 (e.g., provided by a manufacturer). The unit total load per fan may be estimated from a mechanical cooling capacity provided by the compressors 70 and/or 91 plus a free-cooling capacity provided from the air-cooled heat exchanger 56.

The second speed represents an estimated fan speed that may minimize total energy use of the compressors 70 and/or 91 and the fans 60. In some cases, it may be desirable to adjust the fan speed for a particular refrigerant circuit 68 and/or 90 based on the second sped to maintain a compressor oil pressure, a compressor suction pressure, a compressor discharge pressure, and/or other operating conditions within acceptable control limits.

In certain embodiments, the compressor 70 may operate when the one or more fans 60 reach the threshold speed, when the ambient air temperature reaches a predetermined value, and/or when the cooling load demand reaches a predetermined value. Accordingly, the controller 78 may determine the first compressor speed of the compressor 70 (and/or a speed of the second compressor 91) based on the leaving chilled liquid temperature the second speed of the one or more fans 60, the ambient air temperature, and/or the cooling load demand. In other embodiments, the compressor 70 (and/or the second compressor 91) may not be operated until the one or more fans 60 reach the threshold speed. In any case, simultaneously operating the one or more fans 60 below the maximum speed and the compressor 70 may decrease an amount of power consumed by the refrigeration system 12, which may enhance an efficiency of the refrigeration system.

In some cases, the operating conditions (e.g., ambient air temperature and/or cooling load demand) may change during operation of the refrigeration system. Accordingly, at block 138, the controller 78 may be configured to adjust the speed of the one or more fans 60, the compressor speed of the compressor 70, and/or the compressor speed of the second compressor 91 to account for changes in the operating conditions. Additionally, the controller 78 may be configured to switch between different operating modes of the refrigeration system 12 (e.g., see FIG. 7). As a non-limiting example, when the refrigeration system 12 is located in an outdoor environment, the ambient air temperature may decrease during the night and increase during the day (e.g., as a result of sunshine or a lack of sunshine). Therefore, during a hybrid cooling mode of operation that utilizes the one or more fans 60 of the air-cooled heat exchanger 56 and the compressor 70, the controller 78 may be configured to decrease the speed of the one or more fans 60 from the first speed to a second speed (e.g., the second speed is less than the first speed) and/or decrease the first compressor speed of the compressor 70 from the first compressor speed to a second compressor speed (e.g., the second compressor speed is less than the first compressor speed) at night. Similarly, as the ambient air temperature increases during the day, the controller 78 may be configured to increase the speed of the one or more fans 60 from the first speed and/or the second speed to a third speed (e.g., the third speed is greater than the first speed and/or the second speed) and/or to increase the compressor speed of the compressor 70 from the first compressor speed and/or the second compressor speed to a third compressor speed (e.g., the third compressor speed is greater than the first compressor speed and/or the second compressor speed).

Additionally, the controller 78 may be configured to adjust the speed of the one or more fans 60 and/or the speed of the compressor 70 (and/or the second compressor 91) when the cooling load demand increases and/or decreases. In any event, the controller 78 may be configured to determine the speed of the one or more fans 60 and the compressor speed of the compressor 70 (and/or the second compressor 91) by calculating the combination of the speed of the one or more fans 60 and the compressor speed of the compressor 70 (and/or the speed of the second compressor 91) that substantially or generally minimizes the amount of power input to the refrigeration system 12 (e.g., see Equation 2). Accordingly, the efficiency of the refrigeration system 12 may be enhanced.

Figure 7:
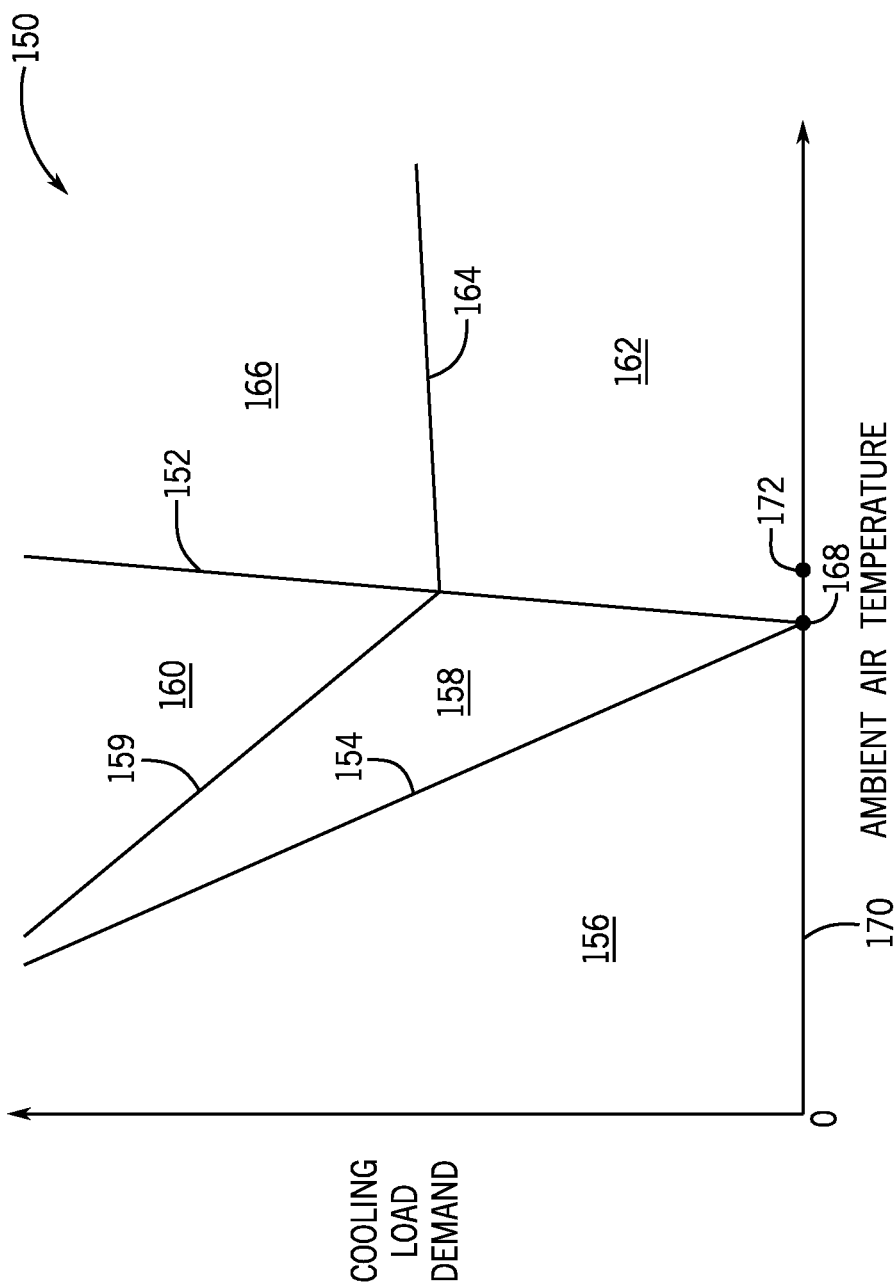
FIG. 7 is a graphical representation of ambient temperature as a function of cooling load demand for various modes of operation of a refrigeration system, in accordance with an aspect of the present disclosure.

FIG. 7 is a graphical representation 150 of ambient air temperature as a function of cooling load demand at various modes of operation of the refrigeration system 12. The graphical representation assumes a constant leaving chilled liquid temperature (LCHLT) (e.g., a temperature received from the return cooling fluid temperature sensor 81) and flow rate. Accordingly, the graphical illustration 150 shows when the refrigeration system 12 may operate in a given mode based at least on the ambient air temperature and cooling load demand. As shown in the illustrated embodiment of FIG. 7, when the ambient air temperature is below a threshold temperature line 152, the free-cooling system 52 may be operated. In certain embodiments, the threshold temperature line 152 may represent the ambient air temperature at which free-cooling may still be effective for absorbing heat from the cooling fluid 58 based on a measured return chilled liquid temperature, a measured ambient air temperature, and/or other operating parameters. Further, when the ambient air temperature is below a second threshold temperature line 154, the refrigeration system 12 may operate in a free-cooling only mode 156. The second threshold temperature line 154 may represent the ambient air temperature at which the cooling load demand may be achieved without utilizing the mechanical cooling system 54 and/or without operating the one or more fans 60 above the threshold speed.

When the ambient air temperature exceeds the second threshold temperature line 154 but is below the threshold temperature line 152, the controller 78 may be configured to operate the compressor 70 of the vapor compression refrigeration cycle 68 in a first hybrid cooling mode 158. In the first hybrid cooling mode 158, the amount of cooling performed by the free-cooling system 52 and the vapor compression refrigeration cycle 68 achieves the cooling load demand. However, in some cases, the ambient air temperature may be below the threshold temperature line 152, but the free-cooling system 52 and the vapor compression refrigeration cycle 68 may not be able to achieve the cooling load demand (e.g., when the cooling load demand exceeds a cooling load demand threshold line 159). Therefore, the second compressor 91 of the second vapor compression refrigeration cycle 90 may be operated in addition to the air-cooled heat exchanger 56 and the compressor 70 of the vapor compression refrigeration cycle 68 to achieve the desired level of cooling. In such cases, the refrigeration system 12 may operate in a second hybrid cooling mode 160.

As the ambient air temperature increases above the threshold temperature line 152, the free-cooling system 52 may consume energy without providing any substantial amount of cooling. Therefore, power supplied to the one or more fans 60 may be blocked and a first mechanical cooling only mode 162 may be performed. The first mechanical cooling only mode 162 may operate the compressor 70 of the vapor compression refrigeration cycle 68 to cool the cooling fluid 58 flowing through the evaporator 66. The first mechanical cooling only mode 162 may achieve the desired level of cooling below a second cooling load demand threshold line 164. Thus, when the cooling load demand exceeds the second cooling load demand threshold line 164 (and the ambient air temperature exceeds the temperature threshold line 152) a second mechanical cooling only mode 166 may be initiated by the controller 78. The second mechanical cooling only mode 166 may operate both the compressor 70 of the vapor compression refrigeration cycle 68 and the second compressor 91 of the second vapor compression refrigeration cycle 90 in order to achieve the cooling load demand.

In certain embodiments, the temperature threshold line 152 and the second temperature threshold line 154 may intersect at a point 168 along an axis 170 representative of the ambient air temperature. The point 168 may be less than a point 172 representative of the LCHLT, such that heat may be transferred from the cooling fluid 58 to the ambient air.

Figure 8:
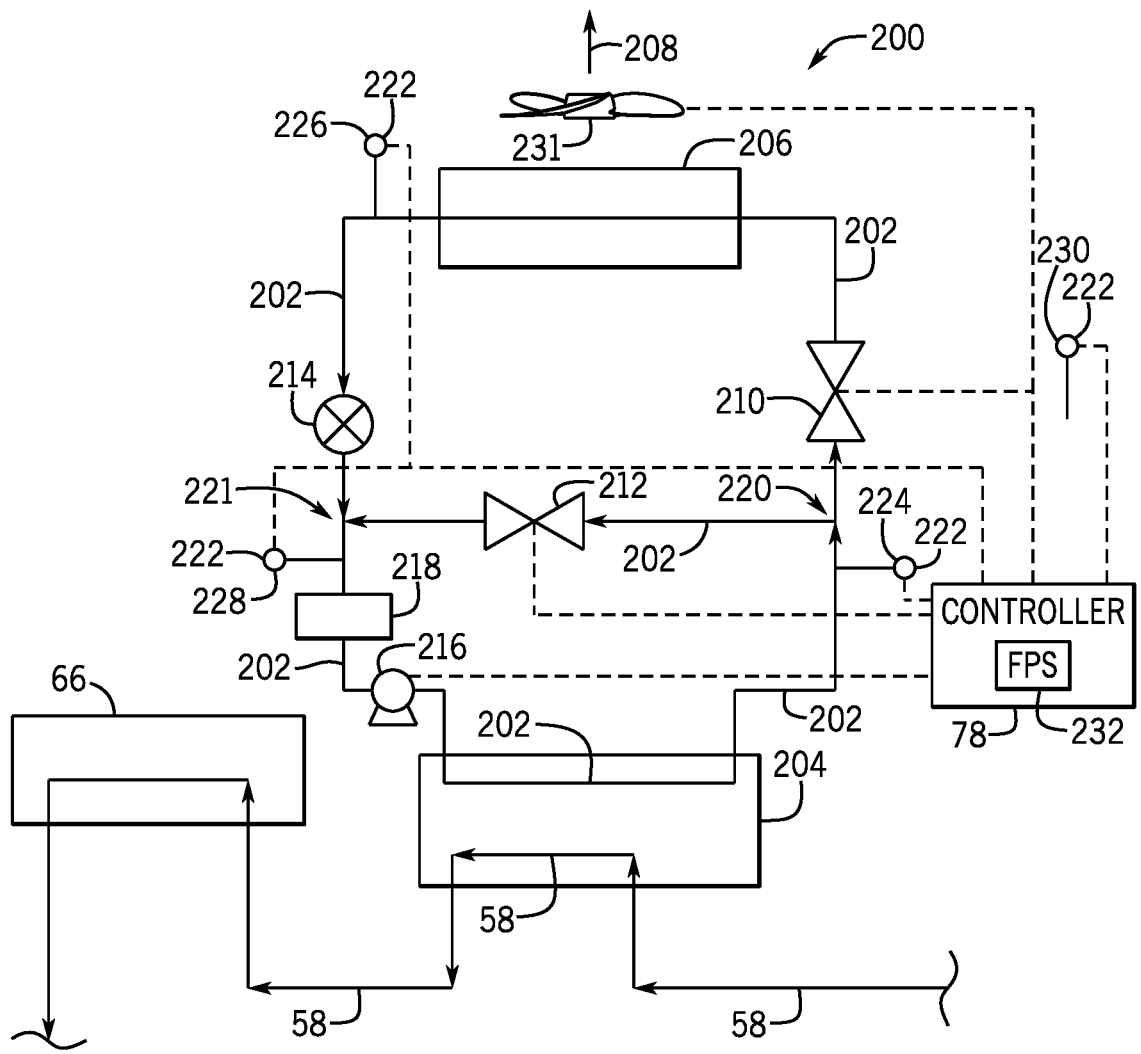
FIG. 8 is a schematic of a free-cooling system that may be utilized with the refrigeration system, in accordance with an aspect of the present disclosure.

FIG. 8 is a schematic of an embodiment of a free-cooling circuit 200 that may be utilized in addition to, or in lieu of, the air-cooled heat exchanger 56. The free-cooling circuit 200 places the cooling fluid 58 in a heat exchange relationship with a working fluid 202 of the free-cooling circuit 200. For example, the refrigeration system 12 may include a heat exchanger 204 that may enable transfer of thermal energy between the cooling fluid 58 and the working fluid 202 of the free-cooling circuit 200. In some embodiments, the cooling fluid 58 may flow through the heat exchanger 204 continuously (e.g., when the heat exchanger 204 replaces the three-way valve 64 or is positioned upstream or downstream of the three-way valve 64). In other embodiments, the cooling fluid 58 may be selectively directed to the heat exchanger 204 using the three way valve 64 (e.g., the heat exchanger 204 replaces the air-cooled heat exchanger 56 or is positioned upstream or downstream of the air-cooled heat exchanger 56). In some embodiments, the working fluid 202 is glycol, a mixture of water and glycol, and/or another suitable fluid. The free-cooling circuit 200 may direct the working fluid 202 through a condenser 206 that places the working fluid 202 in a heat exchange relationship with an airflow 208. Accordingly, the cooling fluid 58 may indirectly transfer thermal energy to the airflow 208 through the free-cooling circuit 200.

In some embodiments, the free-cooling circuit 200 includes a flow control valve 210 (e.g., a butterfly valve or another valve configured to control a flow rate of fluid), a condenser bypass valve 212 (e.g., a butterfly valve or another valve configured to control a flow rate of fluid), a check valve 214, a pump 216, and/or one or more heaters 218. The heaters 218 are configured to maintain a temperature of the working fluid 202 at a target temperature in a loop formed by the pump 216, condenser bypass valve 212, the heat exchanger 204, and connecting piping. Accordingly, the temperature of the working fluid 202 in the loop is above freezing even when the ambient temperature is below freezing. As such, the heat exchanger will not be subjected to subfreezing temperatures when the pump starts. In some embodiments, thermal insulation may be included around the components of the loop to minimize a size of the heaters 218 and to provide a uniform temperature within the loop. The working fluid may flow from the heat exchanger 204 to a first tee connection 220. The flow control valve 210 and/or the condenser bypass valve 212 may be adjusted to direct the working fluid 202 from the tee connection 220 to the condenser 206, back to the heat exchanger 204, or to both the condenser 206 and the heat exchanger 204. For example, when the flow control valve 210 is open and the condenser bypass valve 212 is closed, the working fluid 202 may flow to the condenser 206. Similarly, when the flow control valve 210 is closed and the condenser bypass valve 212 is open, the working fluid 202 may flow back toward the heat exchanger 204, thereby bypassing the condenser 206. When both the flow control valve 210 and the condenser bypass valve 212 are open (or partially open), the working fluid 202 may be directed toward the condenser 206 and back toward the heat exchanger 204, such that the working fluid 202 from the condenser 206 and the working fluid 202 from the condenser bypass valve 212 mix at a second tee connection 221.

The check valve 214 blocks the flow of the working fluid 202 flowing from the condenser bypass valve 212 toward the condenser 206, but enables the working fluid 202 to flow from the condenser 206 (and thus the flow control valve 210) to the heat exchanger 204. In other words, the check valve 214 enables the working fluid 202 to flow in a single direction through the condenser 206. The pump 216 of the free-cooling circuit 200 may control a flow rate of the working fluid 202 through the free-cooling circuit 200, and thus, adjusts an amount of heat transferred between the working fluid 202 and the cooling fluid 58. For example, when ambient temperatures are relatively high, the pump 216 may be shut down (e.g., turn off) because no significant amount of heat may be transferred from the cooling fluid 58 to the working fluid 202. Conversely, when ambient temperatures are relatively low, the one or more heaters 218 may transfer heat to the working fluid 202, such that a temperature of the working fluid 202 is maintained above a threshold (e.g., a temperature that would cause the cooling fluid 58 to freeze).

The controller 78 of the refrigeration system 12 may be coupled to one or more temperature sensors 222 that are disposed along the free-cooling circuit 200 and configured to monitor a temperature of the working fluid 202. For example, the free-cooling circuit 200 may include a first temperature sensor 224 configured to monitor a temperature of the working fluid 202 exiting the heat exchanger 204 (e.g., warm second cooling fluid). The free-cooling circuit 200 may also include a second temperature sensor 226 configured to monitor a temperature of the working fluid 202 exiting the condenser 206 (e.g., cool second cooling fluid). Further, the free-cooling circuit 202 may include a third temperature sensor 228 configured to monitor a temperature of the working fluid 202 entering the heat exchanger 204 (e.g., warm second cooling fluid, cool second cooling fluid, or a mixture of warm second cooling fluid and cool second cooling fluid). In some embodiments, the controller 78 may also be coupled to a temperature sensor 230 that is configured to monitor ambient temperature.

The controller 78 may be configured to adjust a position of the flow control valve 210, a position of the coil bypass valve 212, a speed of a condenser fan 231, and/or a speed of the pump 216 based on feedback received from one or more of the temperature sensors 222. For example, the controller 78 may adjust the position of the flow control valve 210, the position of the coil bypass valve 214, the speed of the condenser fan 231, and/or a speed of the pump 216, such that the working fluid 202 entering the heat exchanger 204 reaches a set point (e.g., a target temperature). The set point may be based on a desired amount of heat transfer between the working fluid 202 and the cooling fluid 58 and/or a temperature (e.g., a target temperature) of the cooling fluid 58.

In some embodiments, the working fluid 202 may include a freezing point that is lower than the cooling fluid 58 (e.g., when the cooling fluid is water and the working fluid is glycol). Accordingly, to block freezing of the cooling fluid 58, the controller 78 of the refrigeration system 12 may include a freeze protection system 232. The freeze protection system 232 may be configured to adjust the position of the flow control valve 210, the position of the condenser bypass valve 212, the speed of the condenser fan 231, and/or the speed of the pump 216 to block or reduce freezing in conduits of the refrigeration system 12 (e.g., tubes within the heat exchanger 204). The controller 78 may be configured to send signals to the flow control valve 210, the condenser bypass valve 212, the condenser fan 231, and/or the pump 216 based on an outlet temperature of the working fluid 202 leaving the condenser 206 (e.g., received from the second temperature sensor 226), the ambient temperature (e.g., received from temperature sensor 230), and/or a position of one or both of the condenser bypass valve 212 and the flow control valve 210.

The freeze protection system 232 may perform specific actions based on feedback indicative of operating conditions of the free-cooling circuit 200. As shown in Table 1 below, the freeze protection system 232 may operate in a first operating mode when the ambient air temperature is above a first target temperature (e.g., 40° F.). When operating in the first operating mode, the controller 78 is configured to send one or more signals to turn off condenser fan 231 (if the condenser fan 231 is not already turned off), turn off the pump 216 (if the pump 216 is not already turned off), turn off the heaters 218 (if the heaters 218 are not already turned off), close the condenser bypass valve 212, and/or open the flow control valve 210 when the ambient temperature is greater than the first target temperature (e.g., a first threshold temperature). When operating in the first operating mode, the freeze protection system 232 enables the working fluid 202 to flow to the condenser 206 before being directed into the heat exchanger 204. As such, the freeze protection system 232 operates in the first mode when the ambient temperature is above the first target temperature, such that the working fluid 202 does not fall below a temperature that may cause the cooling fluid 58 to freeze in the heat exchanger 204.

When the ambient temperature reaches or falls below the first target temperature, the freeze protection system 232 operates in a second mode, as shown in Table 1 below. In the second mode, the freeze protection system 232 sends one or more signals to turn the condenser fan 231 off (if the condenser fan 231 is not already turned off), turn the pump 216 off (if the pump 216 is not already turned off), turn the heaters 218 on, open the condenser bypass valve 212, and/or close the flow control valve 210 when the ambient temperature is less than or equal to the first target temperature. When operating in the second mode, the working fluid 202 bypasses the condenser 206 and is directed back to the heat exchanger 204 through the bypass valve 212. As such, working fluid 202 is circulated back to the heat exchanger 204 without transferring thermal energy to ambient air in the condenser 206. However, because a temperature of the working fluid 202 may be relatively low, the heaters 218 may be activated, such that the cooling fluid 58 in the heat exchanger 204 does not freeze. For example, because the ambient air temperature is below the first target temperature, a temperature of the working fluid 202 flowing through the condenser 206 may fall below a level that may cause the cooling fluid 58 to freeze in the heat exchanger 204 (e.g., via thermal energy transfer with the working fluid 202). Thus, the heaters 218 are activated to increase a temperature of the working fluid 202 above a freezing point of the cooling fluid 58.

As further shown in Table 1 below, the freeze protection system 232 may operate in a third mode based on a temperature of the working fluid 202 leaving the condenser 206. In some embodiments, the third mode of the freeze protection system 232 is initiated after operating in the second operating mode for a predetermined amount of time. For example, when operating in the third mode, the controller 78 sends one or more signals to turn off the condenser fan 231 (if the condenser fan 231 is not already turned off), operate the pump 216 at a fixed speed, turn the heaters 218 off (if the heaters are not already turned off), open the condenser bypass valve 212, and/or open the flow control valve 210. Accordingly, the flow control valve 210 is opened to begin circulating the working fluid 202 through the condenser 206. In some embodiments, the flow control valve 210 is opened incrementally to maintain a temperature of the working fluid 202 entering the heat exchanger 204 above a freezing point of the cooling fluid 58 (e.g., a temperature of the working fluid 202 that would absorb an amount of thermal energy from the cooling fluid 58 to reduce the temperature of the cooling fluid 58 below its freezing point). As such, working fluid 202 flowing through the condenser bypass valve 212 mixes with the working fluid 202 leaving the condenser 206 (e.g., at the second tee connection 221) before the working fluid 202 enters the heat exchanger 204. Thus, the temperature of the working fluid 202 entering the heat exchanger 204 is adjusted to remain above the freezing point of the cooling fluid 58, while enabling the working fluid 202 to begin flowing through the condenser 206.

As the temperature of the working fluid 202 leaving the heat exchanger 204 increases, the freeze protection system 232 may switch to a fourth mode of operation. In the fourth mode of operation, the controller 78 may send one or more signals to turn off the condenser fan 231 (if the condenser fan 231 is not already turned off), operate the pump 216 at a fixed speed, turn off the heaters 218 (if the heaters 218 are not already turned off), close the condenser bypass valve 212, and/or completely open the flow control valve 210. In some embodiments, the condenser bypass valve 212 is closed incrementally when operating in the fourth mode of operation to maintain the temperature of the working fluid 202 entering the heat exchanger 204 above the freezing point of the cooling fluid 58. In other words, once the flow control valve 210 reaches a fully open position (e.g., 100% open or completely open), the controller 78 begins to close the condenser bypass valve 212 to increase a flow of the working fluid 202 directed to the condenser 206 and reduce a flow of the working fluid 202 directed through the condenser bypass valve 212 and toward the heat exchanger 204. As such, the controller 78 adjusts the temperature of the working fluid 202 entering the heat exchanger 204 to remain above the freezing point of the cooling fluid 58. In some embodiments, a temperature of the working fluid 202 remains above the freezing point of the cooling fluid 58 because the condenser fan 231 is turned off.

When the condenser bypass valve 212 is completely closed, the freeze protection system 232 may begin operating under a fifth mode of operation. During the fifth mode of operation, the controller 78 sends one or more signals to adjust a speed of the condenser fan 231 based at least on a cooling demand and/or a compressor demand, adjust a speed of the pump 216 based at least on the inlet temperature of the working fluid 202 to the condenser 206 and/or a highest speed of one of the condenser fans 231 (e.g., when the condenser 206 has a plurality of fans 231), turn off the heaters 218 (if the heaters are not already turned off), completely close the condenser bypass valve 212, and/or completely open the flow control valve 210 (if the flow control valve 210 is not already in a fully open position). Accordingly, once the coil bypass valve 212 is completely closed and the flow control valve 210 is completely open, the controller 78 may modulate a speed of the condenser fan 231 and/or modulate a speed of the pump 216 in order to maintain a temperature of the working fluid 202 entering the heat exchanger 204 at a predetermined temperature (e.g., a target temperature). The predetermined temperature of the working fluid 202 entering the heat exchanger 204 may be based on a cooling demand of the cooling fluid 58 (e.g., determined at least by a temperature of the cooling fluid 58 leaving the heat exchanger 204). As such, the controller 78 receives feedback and adjusts a speed of the condenser fans 206 and/or a speed of the pump 216 to maintain the temperature of the working fluid 202 at the predetermined temperature.

When the ambient air temperature increases above a second target temperature (e.g., 34° F.) and/or when a temperature of the working fluid 202 increases above a third target temperature (e.g., 34° F.), the freeze protection system 232 may initiate a sixth operating mode. For example, when operating in the sixth operating mode, the controller 78 sends one or more signals to adjust the speed of the condenser 206 fans based at least on a cooling demand and/or a compressor demand, adjust a speed of the pump 216 based at least on the highest speed of one of the condenser fans 231, turn off the heaters 218 (if the heaters 218 are not already turned off), completely close the condenser bypass valve 212 (if the condenser bypass valve 212 is not already in a fully closed position), and/or completely open the flow control valve 210 (if the flow control valve 210 is not already in a fully open position). Accordingly, the controller 78 modulates the speed of the condenser fan 231 and/or the speed of the pump 216 to adjust a temperature of the working fluid 202 entering the heat exchanger 204.

While the values of the first and second target temperatures of Table 1 are shown as 40° F. and 34° F., respectively, the values of the first and second target temperatures may be any suitable temperature above the freezing point of the liquid circulating through the heat exchanger 204 to avoid localized freezing in heat exchanger 204. In some embodiments, the value of the first target temperature is greater than the value of the second target temperature, such that the flow control valve 210 and the condenser bypass valve 212 block circulation of the working fluid 202 through the condenser 206 before the pump 214 is initiated (e.g., turned on). Additionally or alternatively, the value of the second target temperature is above a freezing temperature of the cooling fluid 58 to increase an amount of free-cooling, while providing a sufficient margin for control to avoid freezing in the heat exchanger 204.

In some embodiments, a low-temperature limit may also be used to block operation of the pump 214 if the temperature of the working fluid 202 falls below freezing (e.g., approximately 30° F.). In some cases, the working fluid 202 may reach the low-temperature limit as a result of insufficient component operation, reduced supply of electrical power to a component, ambient weather conditions, or other operational deficiencies. The low-temperature limit may be below the second target temperature to avoid trips associated with minor temperature fluctuations, but high enough to avoid freezing of the cooling fluid 58 in the heat exchanger 204. Thus, the low-temperature limit provides a failsafe to avoid freezing in the heat exchanger 204. Additionally, the pump 214 may be configured to activate (e.g., start or turn on) when the temperature of the working fluid 202 rises to a predetermined temperature, such as the second target temperature. In some embodiments, a warning message or alarm may be activated to notify building automation controls, equipment operators, and/or service personnel of a potential concerns with the free-cooling circuit 200.

that a flow of the cooling fluid 58 through the heat exchanger 204 is not blocked. Additionally, the freeze protection system 232 may adjust a speed of the condenser fan 231 and/or a power supplied to one or more heaters 218 disposed along the free-cooling circuit 200 based on the ambient temperature threshold, the threshold outlet temperature of the working fluid 202 leaving the condenser 206, and/or a position of the valves 210 and 212 to control an amount of heat transferred from the working fluid 202 in the condenser 206, and thus, maintain a temperature of the working fluid 202 in the heat exchanger 204 above the freezing point of the cooling fluid 58.

Figure 9:
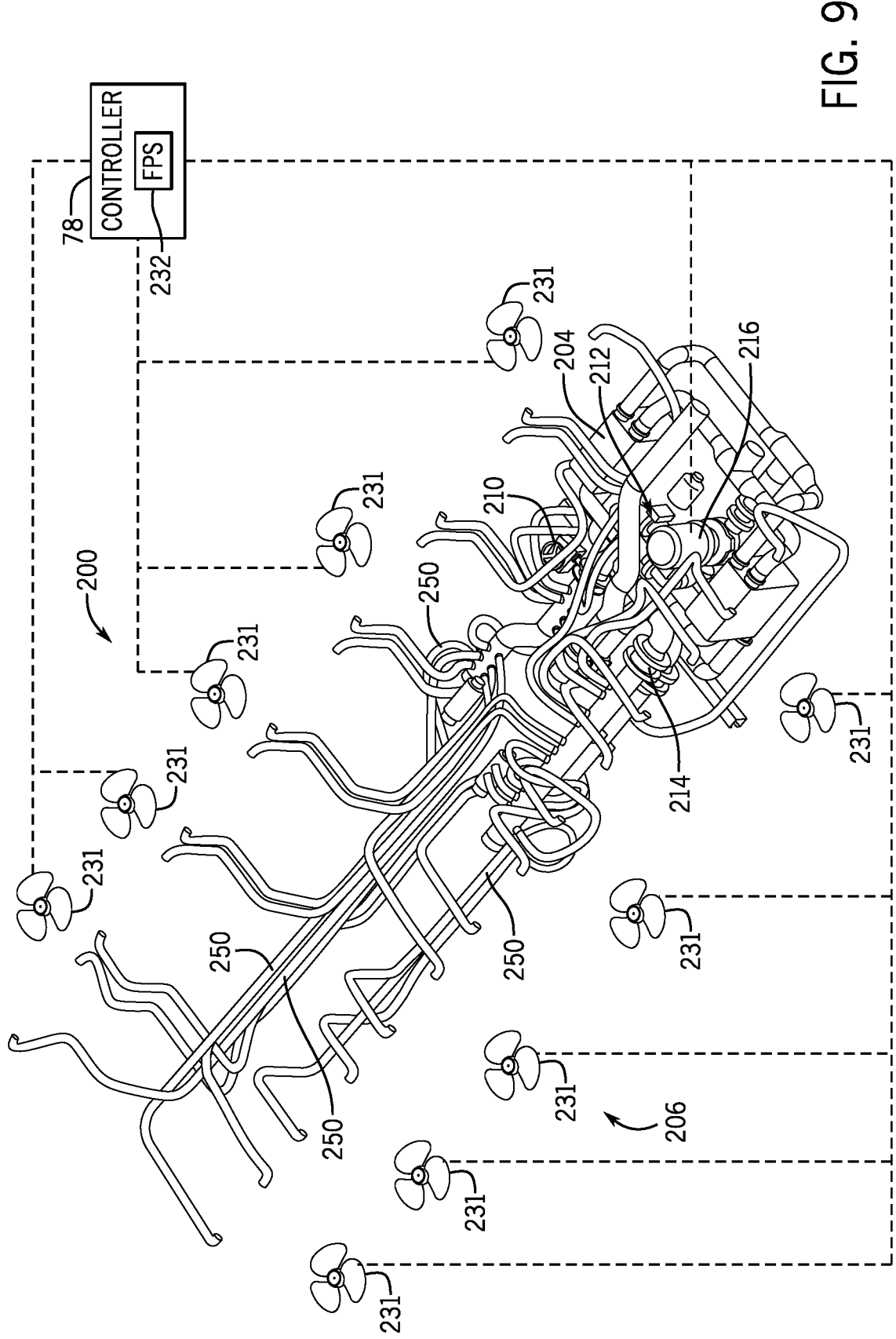
FIG. 9 is a perspective view of an embodiment of the free-cooling system of FIG. 8, in accordance with an aspect of the present disclosure.
Figure 10:
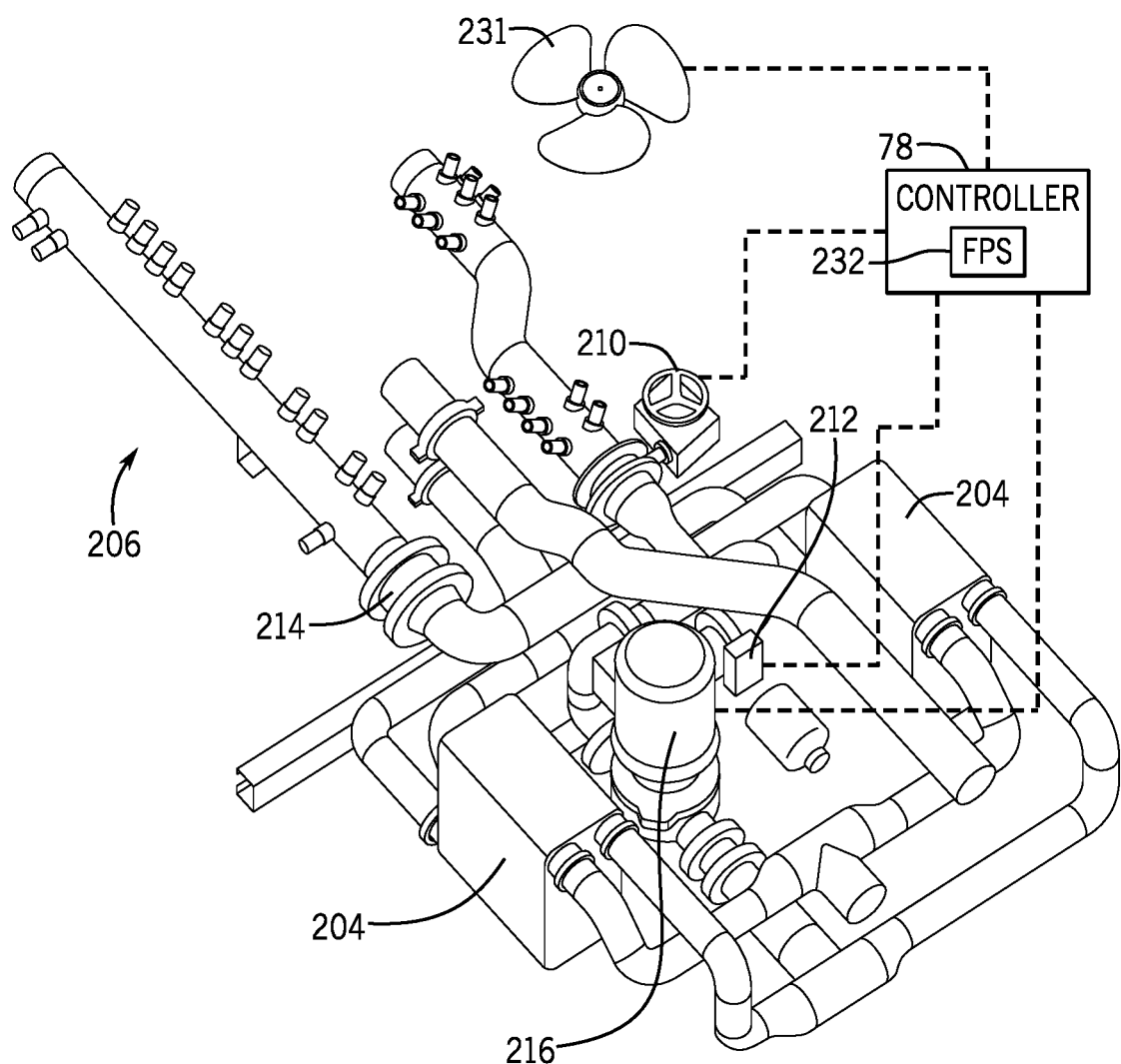
FIG. 10 is a perspective view of an embodiment of the free-cooling system of FIG. 8, in accordance with an aspect of the present disclosure.

FIGS. 9 and 10 are perspective views of an embodiment of the free-cooling circuit 200 that may be utilized in addition to, or in lieu of, the air-cooled heat exchanger 56. As shown in the illustrated embodiment of FIG. 9, the working fluid 202 may be directed through a plurality of conduits 250 of the condenser 206. One or more conduits of the plurality of conduits 250 may correspond to a respective fan 231 of the condenser 206. In other embodiments, the

TABLE 1

Freeze Protection System Modes

| Mode | Fans | Pump | Heaters | Coil Bypass Valve | Flow Control Valve |
|---|---|---|---|---|---|
| OFF, ambient > 40 F. | OFF | OFF | OFF | Closed | Open |
| OFF, ambient <= 40 F. | OFF | OFF | ON | Open | Closed |
| Coil leaving temp < 34 F. | OFF | ON, fixed speed | OFF | Open | Open valve to maintain HX inlet glycol temperature above freezing |
| Coil leaving temp < 34 F. and coil valve 100% open | OFF | ON, fixed speed | OFF | Close valve to maintain HX inlet glycol temperature above freezing | 100% open |
| Coil Bypass valve 100% closed | ON, modulate based on cooling and compressor demand | ON, modulate based on condenser inlet temperature or highest fan speed | OFF | 100% Closed | 100% Open |
| Ambient > 34 F. and coil outlet temperature > 34 F. | ON, modulate to meet capacity and compressor demand | ON, modulate based on highest fan speed | OFF | 100% Closed | 100% Open |

In summary, the freeze protection system 232 adjusts an amount of warm working fluid 202 from the heat exchanger 204 that is mixed with cooled working fluid 202 from the condenser 206 to block the working fluid 202 from cooling the cooling fluid 58 in the heat exchanger 204 below its freezing point. The freeze protection system 232 thus adjusts a position of a condenser bypass valve 212, a position of a flow control valve 210, a speed of the condenser fan 231, and/or a speed of the pump 216 based on an ambient temperature threshold, a threshold outlet temperature of the working fluid 202 leaving the condenser 206, and/or a position of the valves 210 and 212 to control an amount of the working fluid 202 flowing through the condenser 206 and to maintain a temperature of the working fluid 202 above the freezing point of the cooling fluid 58 in the heat exchanger 204. As such, freezing of the cooling fluid 58 in the heat exchanger 204 is reduced and/or eliminated, such condenser 206 includes a single conduit that directs the working fluid 202 to a single fan 231 of the condenser 206. In any case, the controller 78 is coupled to the fan 231 of the condenser 206, such that the controller 78 may adjust the speed of the fan 231 to control a temperature of the working fluid 202 exiting the condenser 206. Additionally, as discussed above, the controller 78 is coupled to the pump 216 and is configured to adjust a speed of the pump 216 to control an amount of working fluid 202 that is circulated through the free-cooling circuit 200 (e.g., from the heat exchanger 204, through the condenser 206, and/or through the condenser bypass valve 212).

One or more of the disclosed embodiments, alone or in combination, may provide one or more technical effects useful in enhancing an efficiency of a refrigeration system that includes a free cooling system and a mechanical cooling system. In general, embodiments of the present disclosure include operating a compressor of the mechanical cooling system when one or more fans of the free cooling system are operating below a maximum speed. In some cases, operating the compressor and the fans of the free cooling system at a speed below the maximum speed may consume less power than operating the compressor and/or the fans at the maximum speed. Accordingly, power input to the refrigeration system may be decreased, and an efficiency of the refrigeration system may be enhanced. The technical effects and technical problems in the specification are exemplary and are not limiting. It should be noted that the embodiments described in the specification may have other technical effects and can solve other technical problems.

While only certain features and embodiments of the present disclosure have been illustrated and described, many modifications and changes may occur to those skilled in the art (e.g., variations in sizes, dimensions, structures, shapes and proportions of the various elements, values of parameters (e.g., temperatures, pressures, etc.), mounting arrangements, use of materials, colors, orientations, etc.) without materially departing from the novel teachings and advantages of the subject matter recited in the claims. The order or sequence of any process or method steps may be varied or re-sequenced according to alternative embodiments. It is, therefore, to be understood that the appended claims are intended to cover all such modifications and changes as fall within the true spirit of the disclosure. Furthermore, in an effort to provide a concise description of the exemplary embodiments, all features of an actual implementation may not have been described (i.e., those unrelated to the presently contemplated best mode of carrying out an embodiment, or those unrelated to enabling the claimed embodiments). It should be appreciated that in the development of any such actual implementation, as in any engineering or design project, numerous implementation specific decisions may be made. Such a development effort might be complex and time consuming, but would nevertheless be a routine undertaking of design, fabrication, and manufacture for those of ordinary skill having the benefit of this disclosure, without undue experimentation.

The invention claimed is:

1. A refrigeration system, comprising:
   a heat exchanger configured to place a cooling fluid in a heat exchange relationship with a working fluid;
   a free-cooling circuit comprising a pump, wherein the pump is configured to circulate the working fluid through the heat exchanger and a coil of the free-cooling circuit;
   a flow control valve of the free-cooling circuit configured to control a flow rate of the working fluid directed to the coil of the free-cooling circuit;
   a coil bypass valve of the free-cooling circuit configured to control a flow rate of the working fluid that bypasses the coil of the free-cooling circuit; and
   a controller configured to adjust a first position of the flow control valve, a second position of the coil bypass valve, a speed of a fan of the coil, a speed of the pump, and a temperature of a heater of the free-cooling circuit based on an ambient temperature, a temperature of the working fluid leaving the coil, the first position of the flow control valve, the second position of the coil bypass valve, or a combination thereof,
   wherein the controller is configured to close the flow control valve of the free-cooling circuit and open the coil bypass valve of the free-cooling circuit when the ambient temperature is less than or equal to a target temperature.

2. The refrigeration system of claim 1, comprising a first temperature sensor and a second temperature sensor communicatively coupled to the controller, wherein the first temperature sensor is configured to provide feedback to the controller indicative of the ambient temperature, and wherein the second temperature sensor is configured to provide feedback to the controller indicative of the temperature of the working fluid leaving the coil.

3. The refrigeration system of claim 1, wherein the target temperature is approximately 40 degrees Fahrenheit (° F.).

4. The refrigeration system of claim 1, comprising the heater of the free-cooling circuit, wherein the controller is configured to turn the heater on when the ambient temperature falls below the target temperature.

5. The refrigeration system of claim 1, wherein the controller is configured to modulate the flow control valve of the free-cooling circuit toward an open position to direct working fluid to the coil after the flow control valve has been closed for a predetermined amount of time, and wherein the controller is configured to modulate the coil bypass valve of the free-cooling circuit toward a closed position when the flow control valve of the free-cooling circuit reaches a fully open position.

6. The refrigeration system of claim 1, wherein the controller is configured to modulate the speed of the fan of the coil of the free-cooling circuit and the speed of the pump of the free-cooling circuit based on an additional temperature of the cooling fluid leaving the heat exchanger, the temperature of the working fluid leaving the coil, or a combination thereof, when the coil bypass valve of the free-cooling circuit reaches a fully closed position.

7. The refrigeration system of claim 1, wherein the controller is configured to adjust the temperature of the heater of the free-cooling circuit based on the ambient temperature, the temperature of the working fluid leaving the coil, the first position of the flow control valve, the second position of the coil bypass valve, or the combination thereof such that freezing of the cooling fluid is blocked by the refrigeration system.

8. The refrigeration system of claim 1, comprising:
   a mechanical cooling circuit configured to enable circulation of a refrigerant; and
   a compressor of the mechanical cooling circuit, wherein the controller is configured to enable a power supply to the compressor in response to the controller being in a mechanical cooling mode such that the compressor causes a refrigerant to circulate through the mechanical cooling circuit, and wherein the controller is configured to disable the power supply to the compressor in response to the controller being in a free-cooling mode.

9. The refrigeration system of claim 8, comprising an evaporator of the mechanical cooling circuit, wherein the evaporator is configured to receive the refrigerant and the cooling fluid such that the cooling fluid is cooled by the refrigerant.

10. The refrigeration system of claim 1, comprising:
    one or more water conduits configured to circulate the cooling fluid through a building; and
    a plurality of air handlers configured to receive the cooling fluid from the one or more water conduits.

11. One or more tangible, non-transitory machine-readable media comprising processor-executable instructions to:
    receive feedback indicative of an ambient temperature;
    compare the ambient temperature to a target temperature;
    close a flow control valve of a free-cooling circuit and open a coil bypass valve of the free-cooling circuit when the ambient temperature is less than or equal to the target temperature, wherein the free-cooling circuit is configured to circulate a working fluid through a heat exchanger that places the working fluid in a heat exchange relationship with a cooling fluid;

modulate the flow control valve of the free-cooling circuit toward an open position to direct working fluid to the coil after the flow control valve has been closed for a predetermined amount of time;

modulate the coil bypass valve of the free-cooling circuit toward a closed position when the flow control valve of the free-cooling circuit reaches a fully open position; and modulate a first speed of at least one fan of the coil of the free-cooling circuit and a second speed of a pump of the free-cooling circuit based on a first temperature of the cooling fluid leaving the heat exchanger, a second temperature of the working fluid leaving the coil, or a combination thereof, when the coil bypass valve of the free-cooling circuit reaches a fully closed position.

12. The one or more tangible, non-transitory machine-readable media of claim 11, wherein the processor-executable instructions are configured to activate a heater of the free-cooling circuit when the ambient temperature is less than or equal to the target temperature.

13. The one or more tangible, non-transitory machine-readable media of claim 11, wherein the processor-executable instructions are configured to modulate the first speed of the at least one fan of the coil based on the first temperature of the cooling fluid leaving the heat exchanger.

14. The one or more tangible, non-transitory machine-readable media of claim 11, wherein the processor-executable instructions are configured to modulate the second speed of the pump based on the second temperature of the working fluid leaving the coil, or the first speed of a first fan of the at least one fan of the coil, or both.

15. The one or more tangible, non-transitory machine-readable media of claim 14, wherein the coil comprises the first fan and a second fan of the at least one fan, and wherein the first speed of the first fan is greater than a second speed of the second fan.

16. A method, comprising:
receiving feedback indicative of an ambient temperature;
comparing the ambient temperature to a target temperature;
closing a flow control valve of a free-cooling circuit and opening a coil bypass valve of the free-cooling circuit when the ambient temperature is less than or equal to the target temperature, wherein the free-cooling circuit is configured to circulate a working fluid through a heat exchanger that places the working fluid in a heat exchange relationship with a cooling fluid;
modulating the flow control valve of the free-cooling circuit toward an open position to direct working fluid to the coil after the flow control valve has been closed for a predetermined amount of time;
modulating the coil bypass valve of the free-cooling circuit toward a closed position when the flow control valve of the free-cooling circuit reaches a fully open position; and
modulating a first speed of at least one fan of the coil of the free-cooling circuit and a second speed of a pump of the free-cooling circuit based on a first temperature of the cooling fluid leaving the heat exchanger, a second temperature of the working fluid leaving the coil, or a combination thereof, when the coil bypass valve of the free-cooling circuit reaches a fully closed position.

17. The method of claim 16, comprising activating a heater of the free-cooling circuit when the ambient temperature is less than or equal to the target temperature.

18. The method of claim 16, wherein modulating the first speed of the at least one fan of the coil of the free-cooling circuit comprises modulating the first speed of the at least one fan of the coil based on the first temperature of the cooling fluid leaving the heat exchanger.

19. The method of claim 16, wherein modulating the second speed of the pump of the free-cooling circuit comprises modulating the second speed of the pump based on the second temperature of the working fluid leaving the coil, or the first speed of a first fan of the at least one fan of the coil, or both.

* * * * *